United States Patent
Champion et al.

(10) Patent No.: US 10,271,043 B2
(45) Date of Patent: Apr. 23, 2019

(54) 3D USER INTERFACE—360-DEGREE VISUALIZATION OF 2D WEBPAGE CONTENT

(71) Applicant: zSpace, Inc., Sunnyvale, CA (US)

(72) Inventors: Clifford S. Champion, San Jose, CA (US); Eduardo Baraf, Mountain View, CA (US); Alexandre R. Lelievre, Hollywood, CA (US); Jonathan J. Hosenpud, San Francisco, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 15/355,298

(22) Filed: Nov. 18, 2016

(65) Prior Publication Data

US 2018/0144556 A1    May 24, 2018

(51) Int. Cl.
| | |
|---|---|
| *G06F 3/0481* | (2013.01) |
| *G06F 3/0484* | (2013.01) |
| *H04N 13/398* | (2018.01) |
| *G06F 17/30* | (2006.01) |
| *H04N 13/275* | (2018.01) |
| *G06F 3/0354* | (2013.01) |

(52) U.S. Cl.
CPC ....... *H04N 13/398* (2018.05); *G06F 3/04815* (2013.01); *G06F 3/04845* (2013.01); *G06F 17/30905* (2013.01); *H04N 13/275* (2018.05); *G06F 3/03545* (2013.01)

(58) Field of Classification Search
None
See application file for complete search history.

(56) References Cited

U.S. PATENT DOCUMENTS

| | | | |
|---|---|---|---|
| 7,467,356 B2 | 12/2008 | Gettman et al. | |
| 8,643,569 B2 | 2/2014 | Vesely | |
| 9,013,474 B2 | 4/2015 | Park | |
| 9,224,238 B2 | 12/2015 | Weill | |
| 9,678,929 B2 | 6/2017 | Andriotis | |
| 9,721,045 B2 | 8/2017 | Arrighi | |
| 9,886,102 B2 | 2/2018 | Hosenpud | |
| 2003/0197737 A1 | 10/2003 | Kim | |
| 2007/0083383 A1 | 4/2007 | Van Bael | |
| 2010/0169837 A1 | 7/2010 | Hyndman | |
| 2011/0161843 A1 | 6/2011 | Bennett et al. | |
| 2012/0036226 A1* | 2/2012 | Chor | G06F 17/30879 709/219 |
| 2012/0162214 A1 | 6/2012 | Chavez | |
| 2012/0249443 A1* | 10/2012 | Anderson | A63F 13/06 345/173 |
| 2012/0249531 A1 | 10/2012 | Jonsson | |
| 2013/0083021 A1 | 4/2013 | Cohen | |
| 2013/0104018 A1 | 4/2013 | Shefi | |
| 2013/0141434 A1 | 6/2013 | Sugden | |
| 2013/0328870 A1 | 12/2013 | Grenfell | |

(Continued)

*Primary Examiner* — Michelle Chin
(74) *Attorney, Agent, or Firm* — Meyertons Hood Kivlin Kowert & Goetzel, P.C.; Jeffrey C. Hood; Brian E. Moore

(57) ABSTRACT

Systems and methods for displaying a three-dimensional (3D) workspace, including a 3D internet browser, in addition to a traditional two-dimensional (2D) workspace and for browsing the internet in a 3D/virtual reality workspace and transforming and/or upconverting objects and/or visual media from the 2D workspace and/or 2D webpages to the 3D workspace as 3D objects and/or stereoscopic output for display in the 3D workspace.

20 Claims, 24 Drawing Sheets

(56) References Cited

U.S. PATENT DOCUMENTS

| | | |
|---|---|---|
| 2014/0122579 A1 | 5/2014 | Friefeld |
| 2014/0168232 A1* | 6/2014 | Hart .................. G06T 15/005 |
| | | 345/520 |
| 2014/0184589 A1 | 7/2014 | Vesely |
| 2014/0240312 A1 | 8/2014 | Vesely |
| 2014/0267637 A1 | 9/2014 | Haberman |
| 2014/0278920 A1 | 9/2014 | Holden |
| 2015/0035821 A1 | 2/2015 | Andriotis |
| 2015/0036174 A1 | 2/2015 | Pettis |
| 2015/0082180 A1 | 3/2015 | Ames |
| 2015/0082181 A1 | 3/2015 | Ames |
| 2015/0091906 A1 | 4/2015 | Dishno |
| 2015/0123891 A1 | 5/2015 | Tu |
| 2015/0331575 A1 | 11/2015 | Fernandez-Ruiz |
| 2016/0154457 A1 | 6/2016 | Osaragi |
| 2016/0314100 A1 | 10/2016 | Seo |
| 2017/0024112 A1 | 1/2017 | McKegney |
| 2017/0061700 A1* | 3/2017 | Urbach .................. G06F 3/011 |
| 2017/0161448 A1 | 6/2017 | Fram |
| 2017/0161937 A1 | 6/2017 | Divieriksen |
| 2017/0277666 A1 | 9/2017 | Andriotis |

* cited by examiner

3D USER INTERFACE—360-DEGREE VISUALIZATION OF 2D WEBPAGE CONTENT

TECHNICAL FIELD

This disclosure relates to the field of digital display and more particularly to methods and systems for displaying a three-dimensional (3D) workspace, including a 3D internet browser.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

SUMMARY

Various embodiments of a system for implementing methods for displaying a three-dimensional (3D) workspace, including a 3D internet browser, in addition to a traditional two-dimensional (2D) workspace and for transforming objects from the 2D workspace to the 3D workspace for 3D display of the objects. The system may include one or more displays and at least one processor coupled to the one or more displays. In some embodiments, the one or more displays and at least one processor may be comprised in a head mounted display system. In some embodiments, the system may further include a stylus communicatively coupled to the at least one processor and a memory coupled to the at least one processor. The processor may be configured to perform or implement embodiments of the techniques disclosed herein. Additionally, a method implementing embodiments of the techniques may be implemented on a computer or stored as program instructions on a computer readable memory medium.

In some embodiments, a processor may be configured to scan a webpage structure for 3D content, identify at least one instance of 3D content, select, responsive to first user input, the at least one instance of 3D content, copy, from the webpage, the at least one instance of 3D content, and render, responsive to second user input, the at least on instance of 3D content within a 3D workspace. The 3D content may include one or more of embedded JavaScript, nested JavaScript, one or more uniform resource locators, and/or one or more plugin-based viewers. In some embodiments, the processor may be further configured to render the at least one instance 3D content based at least in part on one or more of a location of mesh data, a location of texture and shader data, a scale of mesh data, bounding box dimensions of mesh data, a location of the 3D content at the time of the first user input, an orientation of the 3D content in the webpage structure, and/or a location and orientation of a user input device at the time of the second user.

In some embodiments, a processor may be configured to scan a 2D webpage structure for a set of images and associated locations of the images within the webpage structure, identify at least one set of images, render the set of images as a 3D object, and rotate, responsive to first user input, the rendering of the 3D object. In some embodiments, each image of the set of images may be from a different viewpoint. In some embodiments, the processor, to render the set of images as the 3D object, may order unordered images within the set of images for stereo viewing, wrap, render, and/or re-render output of an existing monoscopic 3D viewer within the 2D webpage structure, and/or render a left image and a right image to produce a stereoscopic view.

In some embodiments, a processor may be configured to detect, within a web browser, stereoscopic content in a two-dimensional (2D) webpage structure, convert the detected stereoscopic content to a three-dimensional (3D) object, and render, within the web browser, the 3D object. The stereoscopic content may be included in the 2D webpage structure via a non-natively stereoscopic format and the non-natively stereoscopic format may include one of a side-by-side format, a top-bottom format, an interleaved format, and/or an anaglyph.

BRIEF DESCRIPTION OF THE DRAWINGS

A better understanding of the present disclosure can be obtained when the following detailed description of the preferred embodiment is considered in conjunction with the following drawings, in which.

Figure 1:
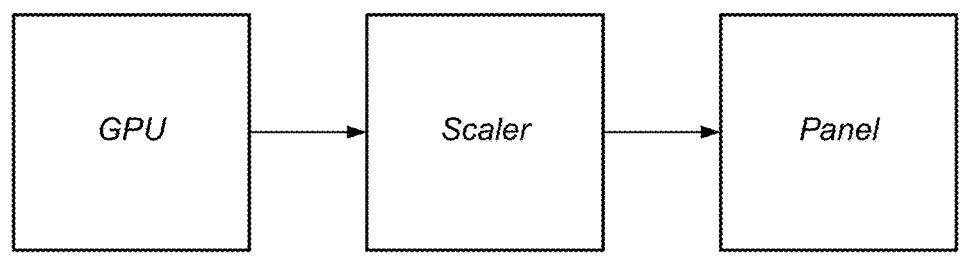
FIG. 1 illustrates a modern display chain, according to the prior art.
Figure 2A:
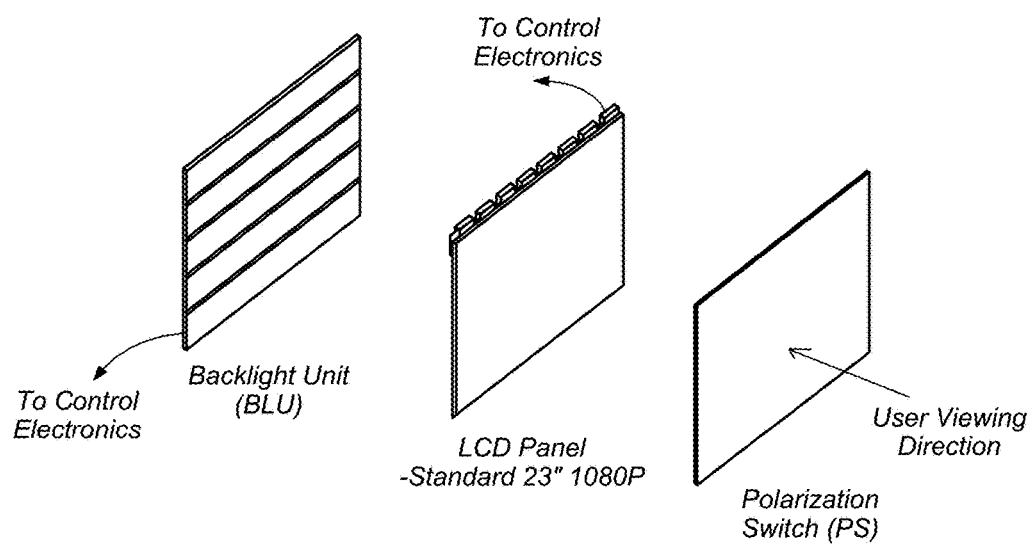
FIG. 2A illustrates an example of an architecture that utilizes a polarization switch, according to the prior art.
Figure 2B:
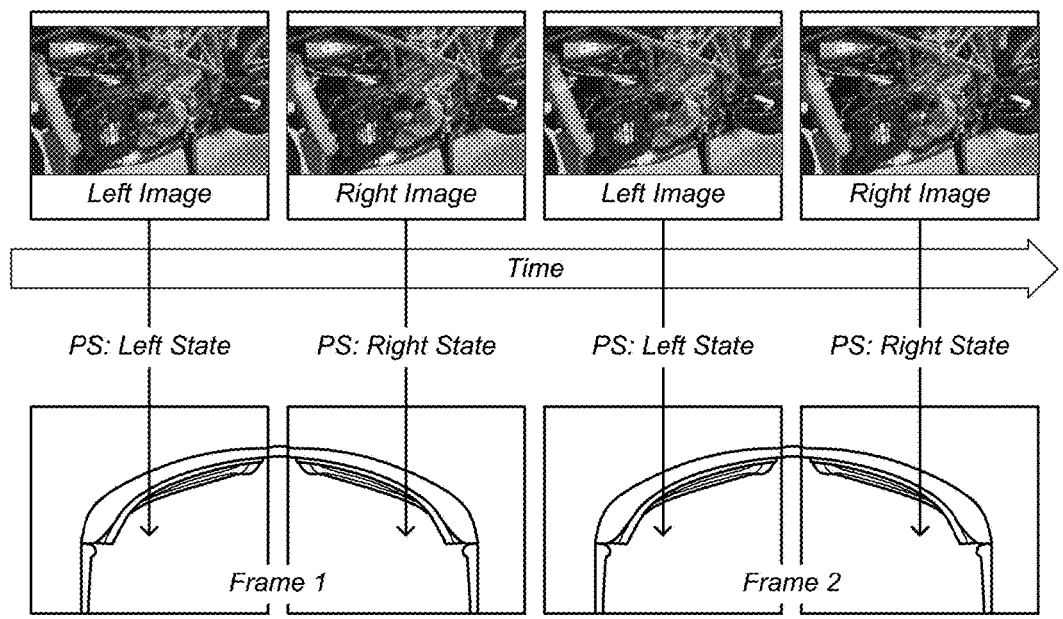
FIG. 2B illustrates an example of a stereo effect (simulated 3D) using polarization switching between left and right views, according to the prior art.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.;

a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Figure 4:
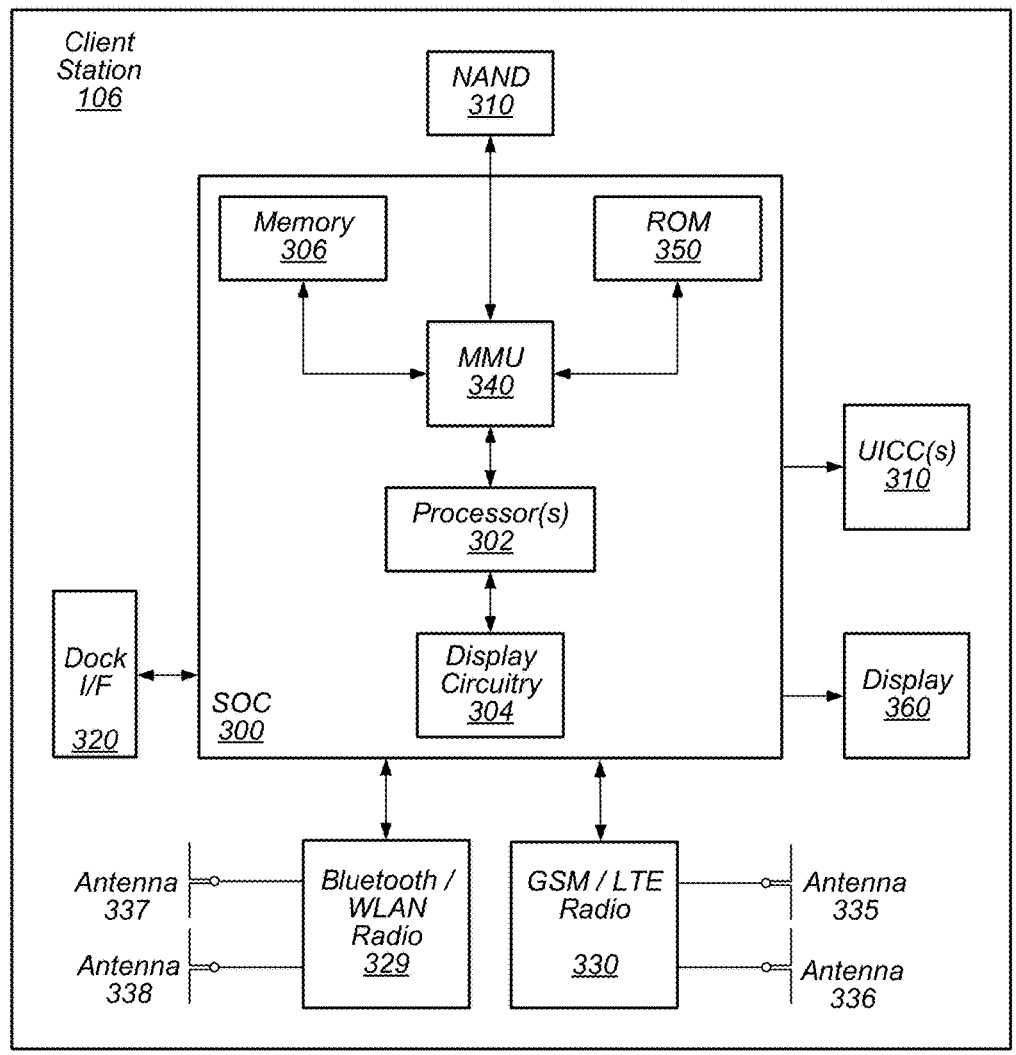
FIG. 4 illustrates an example block diagram of a user equipment device configured according to some embodiments.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3:
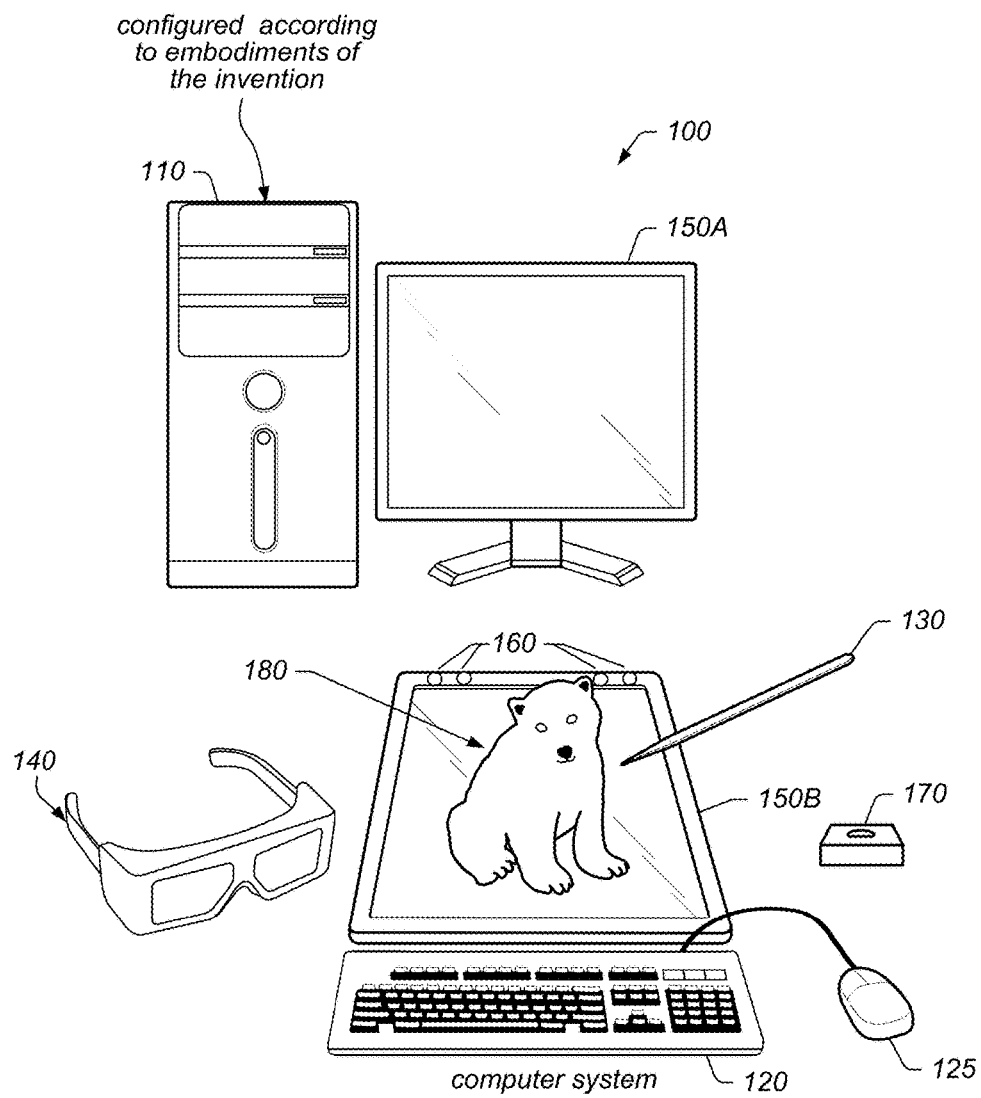
FIG. 3 illustrates an example 3D stereoscopic display system configured according to some embodiments.

FIG. 3 illustrates an exemplary system configured to implement various embodiments of the techniques described below.

In the exemplary embodiment of FIG. 3, computer system 100 may include chassis 110, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three-dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of Figure is exemplary only, and other numbers of displays are also envisioned. For example, the computer system 100 may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used in conjunction with other positional information of the system (e.g., an accelerometer and/or gyroscope within the stylus itself) to perform more precise 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user input device 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive data (e.g., image data, video data, audio data, etc.) over the network from a system similar to system 100. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110 to determine a position or a POV, e.g., via execution of one or more programs by or on a processor or functional unit of chassis 110, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110.

Thus, the system 100 may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100 may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

According to various embodiments of the present disclosure, the display module 230 may display various types of information (for example, multimedia data or text data) to be provided to the user. The display module 230 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display module 230 may be connected functionally to an element(s) of the electronic device. Also, the display module 230 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIG. 4 and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a WiFi, Bluetooth, or Bluetooth low energy connection) or via a wired interface such as a universal serial bus interface, among other wired interfaces.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
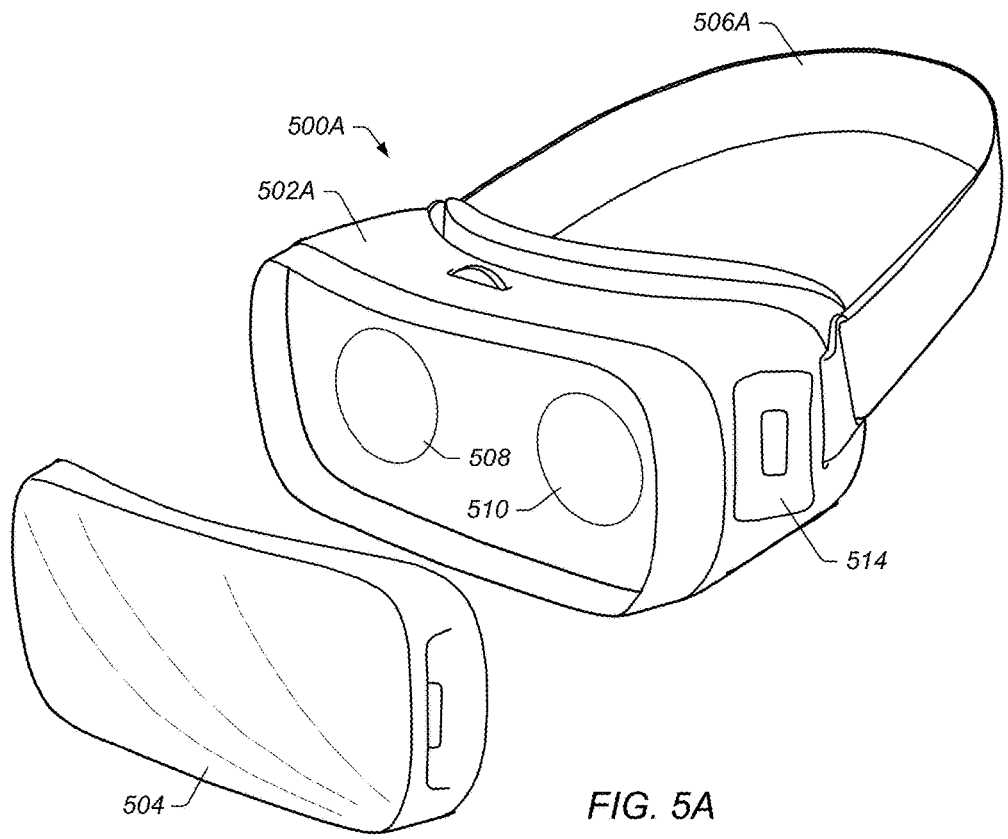
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
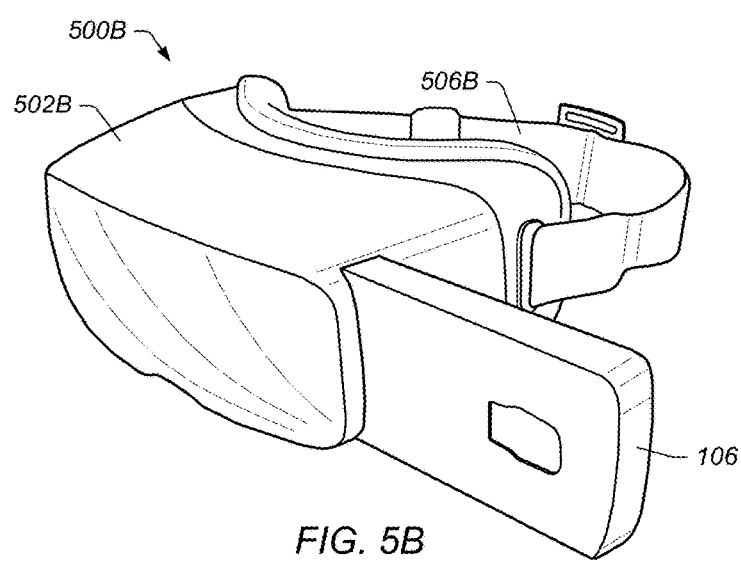

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
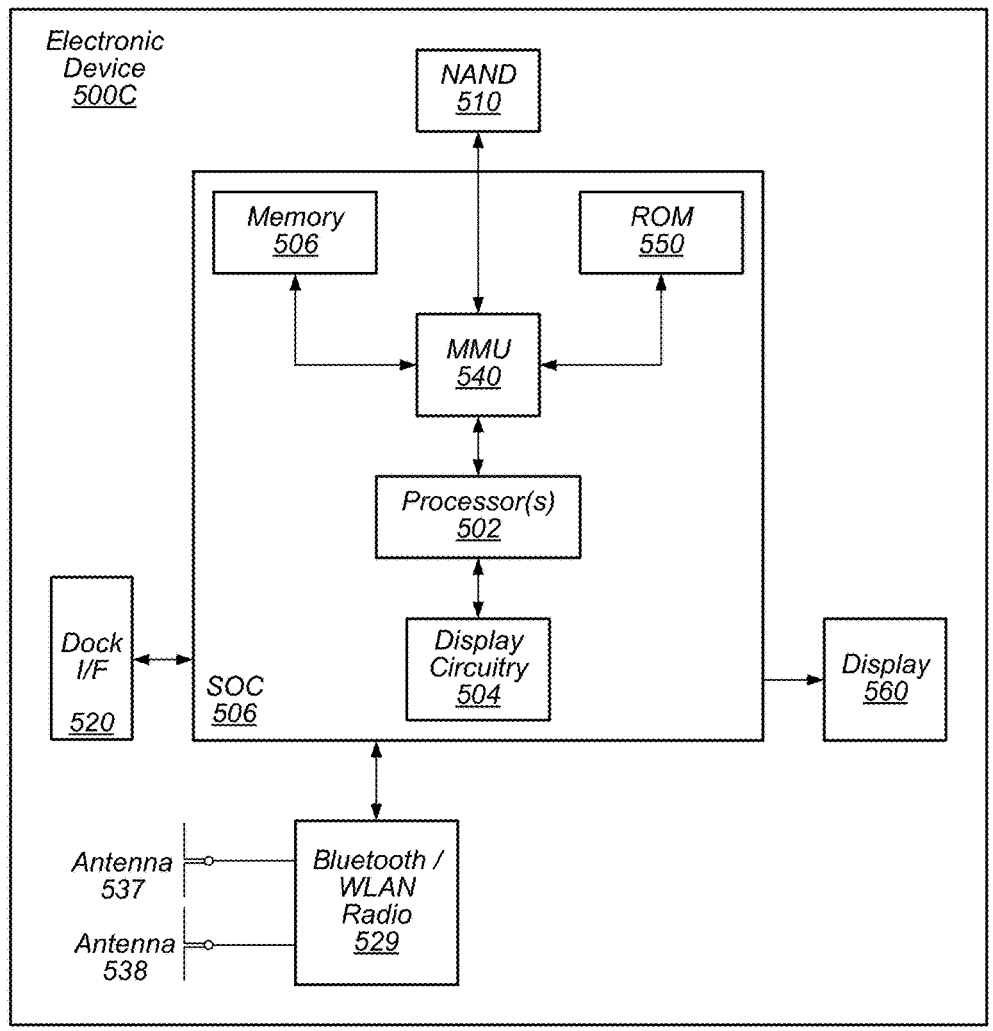
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
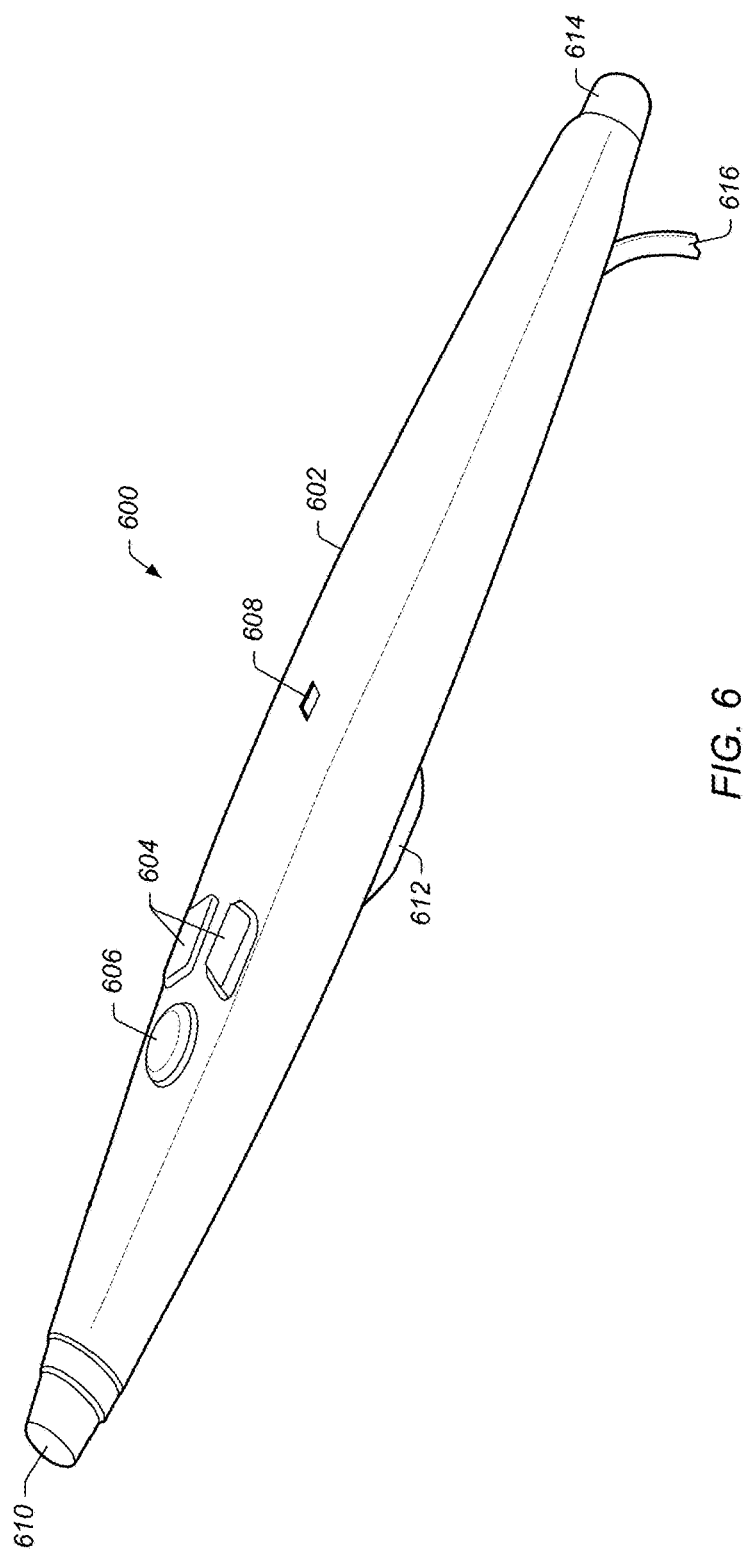
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, system 100 or systems 500 and 550. As described above, systems 100, 500, and 550 may have the capability to determine the six axis position and orientation of user input device 600. Note that this includes the X, Y, Z location of tip 610 of user input device 600 and the a, (3, y angular orientation of body 602 of user input device 600. However, it should be further noted that user input device 600 is exemplary, and that other user input devices, suitably configured, may be used as desired.

As shown, user input device 600 may include buttons 604, 606, and 612. One of the buttons, such as button 606, may be depressed and held down to trigger the selection of an object within a 3D scene presented by any of systems 100, 500, and 550. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Three-Dimensional Workspace

FIGS. 7A-14C, described below in detail, illustrate various embodiments of functionalities of a three-dimensional workspace. According to embodiments, the above described systems may be configured to implement methods for displaying a three-dimensional (3D) workspace, including a 3D internet browser, in addition to a traditional two-dimensional (2D) workspace and for transforming objects from the 2D workspace to the 3D workspace for 3D display of the objects. For example, embodiments may enable conversion of an object displayed within a 2D document, such as an Internet document, to an object displayed within a 3D workspace. Thus, images, videos (including stereo videos), and 3D models may be "pulled" from within a 2D rendering into a 3D rendering environment (or workspace).

In some embodiments, a 3D workspace may include or be a 3D internet (or web) browser and may enable various interactions between a 2D workspace (including a 2D or standard internet or web browser) and the 3D internet browser. For example, in some embodiments, a 2D internet document may include stereoscopic 360-degree product photos and these product photos may be visualized and interacted with within the 3D internet browser and/or within the 3D workspace. In other words, methods may enable 3D visualization and interaction with stereoscopic 360-degree product photos provided in a 2D internet document.

As another example, a 3D object may be "dragged-and-dropped" from a webpage (e.g., a 2D internet document and/or a 3D internet document) to a portion of the 3D workspace representative of a 3D virtual printer. In addition, such "drag-and-drop" action may initiate actual 3D printing of the 3D object, which may be an internet object in some embodiments. As used herein, the term "drag-and-drop," and variations thereof, refers to actions including selecting an object via a user input device (e.g., such as user input device 600), moving the object in response to movement of the user input device, and placing the object within a portion of a workspace. Thus, methods may enable drag-and-drop of a 3D object from a webpage to a 3D printer virtual representation and may further initiate actual 3D printing of the 3D object.

In some embodiments, an advertisement may be transmitted via the web to the end-user (e.g., via a webpage as described above). In some embodiments, the advertisement may be virtual reality (VR) enabled (e.g., via mechanisms as described herein) and may be selected based on predicted efficacy of the ad content to a current user. The VR advertisement may allow the user to customize or interact with the 3D object and, in some embodiments, user customization and interaction may be reported back to a server for metrics on advertisement interaction levels and efficacy. In some embodiments, interaction levels may be based on where a user is looking (e.g., via head and eye tracking as described above), as well as user interaction with a hand-held or hand-based input device(s) (e.g., such as user input device 600). In some embodiments, a delivery mechanism as described herein may also have graceful fallback to 2D for non-VR enabled browsers, using standard markup.

In some embodiments, the 3D internet browser may include portions accessible via selection of tabs. In other words, the 3D internet browser (or 3D workspace) may be a tab-based internet browser where tabs of the internet browser exist in a 3D workspace. Thus, the tabs may be auto-arranged within the 3D workspace and/or may be manually placed in custom arrangements based on user input from a user input device or pre-saved configurations.

In some embodiments, an internet document may indirectly and automatically influence the 3D workspace (or 3D browser). For example, if an internet document describes weather, the 3D workspace may incorporate a simulation of weather effects as described by the current internet document, e.g., the 3D workspace may simulate rain or snow based on the weather effects described. As another example, if the internet document describes a location in the world, the 3D space may incorporate a globe, with a marker pointing out geographic data referenced in the current internet document. Yet another example, if the internet document describes a newsworthy or notable figure, the 3D workspace may incorporate biographical, social, and/or photographical content associated with the notable figure.

In some embodiments, the 3D workspace may automatically convert windowed, side-by-side photos, videos, and/or HMD 3D content to frame-sequential stereo 3D format. In some embodiments, the 3D workspace may automatically convert windowed, anaglyph photos and/or videos in an internet document to frame-sequential stereo 3D format. In some embodiments, an internet audio file's sound spectrum may be visualized in the 3D workspace. The visualization may be in real-time.

In some embodiments, 3D geographic and/or height-field data (e.g., Google Maps®/Google Earth®) from an internet document may be visualized in the 3D workspace (e.g., a stereoscopic-enabled browser). Further, internet documents may be bookmarked (or tagged/flagged/saved) and may further be placed ("dragged-and-dropped") into a portion of the 3D workspace. Additionally, one or more internet video or audio playlists may be visualized and managed in the 3D workspace. In addition, in some embodiments, the 3D workspace may include internet documents and/or objects and may be saved, restored, and/or shared. The 3D workspace may also include navigation and/or searching of a browser history using 3D arrangements of a user's historical navigation and/or searching data.

In some embodiments, internet documents within the 3D workspace may be edited (or modified) via attachment of virtual notes (e.g., virtual Post-it® notes). Internet documents may also be analyzed within the 3D workspace for 3D mesh data. Further, the 3D workspace may automatically present 3D mesh data in stereoscopic 3D. In some embodiments, a 3D model file may be downloaded (e.g., saved to a local location from a remote location) from a 3D browser to the 3D workspace and immediately (or substantially immediately) rendered in its 3D form.

In some embodiments, an existing internet document or image format may be embedded with extended stereographic and/or 3D information.

In some embodiments, the 3D workspace may be a collaborative environment. The collaboration may occur in real-time and may enable bi-directionally sharing (i.e., collaboration) of a 3D workspace with other users (e.g., friends and/or coworkers).

In some embodiments, the 3D workspace may include navigation and/or searching of product recommendations in e-commerce systems using a 3D arrangement of product/similarity aspects. In addition, an e-commerce product photo or model may be "dragged-and-dropped" onto a 3D mannequin (e.g., clothing, car wheels, car accessories) or into a 3D reproduction of a space (e.g., furniture into a living room, a desk into an office) within the 3D workspace. In some embodiments, an e-commerce product model may be viewed at 1:1 "real-world" scale within the 3D workspace. The 3D workspace may also publish and display a 3D advertisement in an internet document.

In some embodiments, the 3D workspace may export and/or share a snapshot or real-time broadcast of the 3D workspace in a format viewable on non-3D browsing capable environments (or workspaces). Further, the 3D workspace may include navigation of photo search results using a 3D arrangement of photo results based on meta data and visual similarity analysis. In some embodiments, a 360-degree video may be viewed within the 3D workspace (or 3D browsing environment).

It should be noted that the above-described embodiments are exemplary only, and are not intended to limit the invention to any particular form, function, or appearance. Moreover, in further embodiments, any of the above features may be used in any combinations desired. In other words, any feature disclosed above with respect to one method or system may be incorporated or implemented in embodiments of any of the other methods or systems.

FIGS. 7A-7E: Extracting 3D Object from a Webpage

Figure 7A:
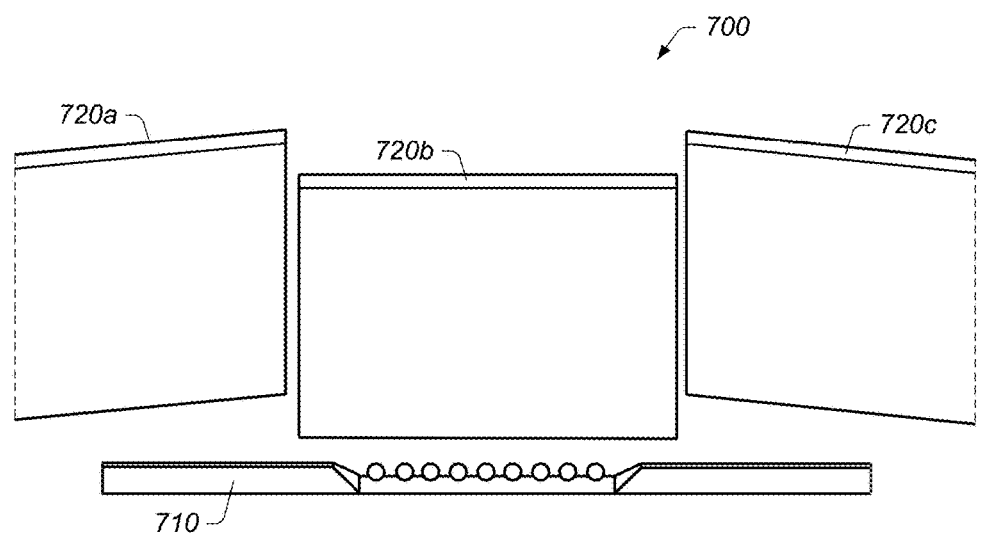
FIGS. 7A-7D illustrate an example of identifying, selecting, and dragging a 3D object from a webpage, according to some embodiments.
Figure 7B:
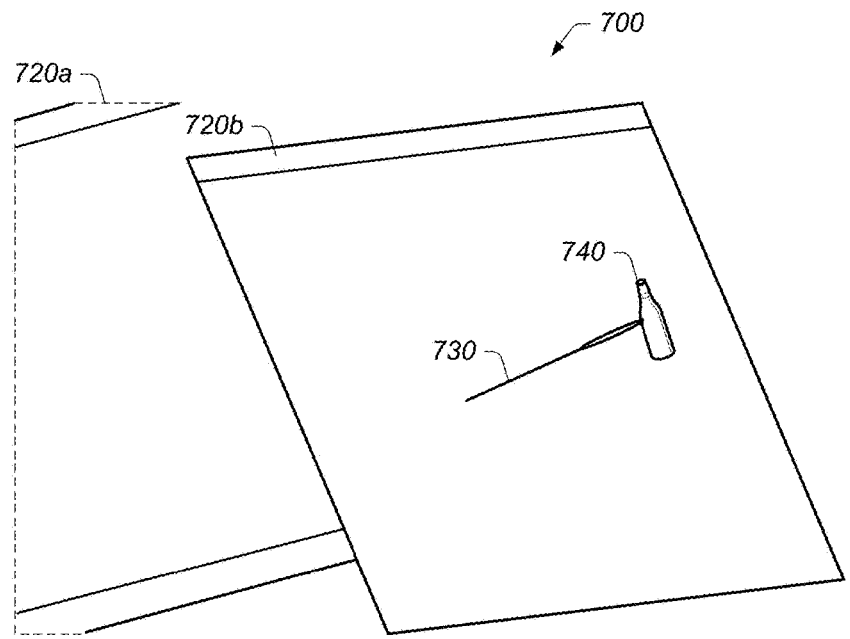
Figure 7C:
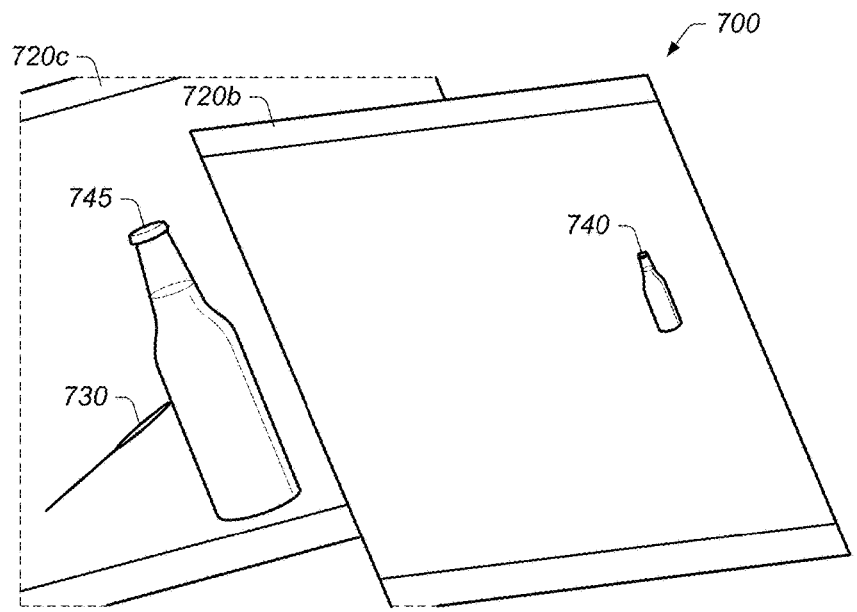

In some embodiments, as described above, a 3D object may be "dragged-and-dropped" from a webpage (e.g., a 2D internet document and/or a 3D internet document) to a portion of the 3D workspace representative of a 3D virtual printer. In addition, such "drag-and-drop" action may initiate actual 3D printing of the 3D object as further described below, which may be an internet object in some embodiments. FIGS. 7A-7C illustrate an example of a method for identifying, selecting, and dragging a 3D object from a webpage, according to some embodiments. Note that the method may be implemented on or with any of the systems or devices described above.

As illustrated at FIG. 7A, a three-dimensional (3D) workspace, such as 3D workspace 700 may include a task bar, such as task bar 710, and may display an internet browser that includes one or more windows, such as windows 720a-c, displaying one or more webpages. The windows 720a-c may be arranged within 3D workspace 700 such that a user may toggle or scroll between windows 720a, 720b, and 720c via a user input command (e.g., via a command from an input device, such as user input device 600 described above). In some embodiments, a webpage structure (e.g., a markup or DOM tree), such as the webpage structure displayed in window 720b, may be scanned for explicit references to 3D models and/or 3D content (e.g., such as uniform resource locators (URLs), embedded or nested 3D JavaScript, plugin-based viewers such as WebGL, and so forth) to identify underlying 3D data. Once identified, a 3D model and/or 3D content may be moved and/or cloned (copied) to 3D workspace 700.

Turning to FIG. 7B, a 3D model and/or 3D content (hereinafter, 3D object) may be identified (e.g., either via scanning and/or user recognition/identification). Thus, a user may direct (or manipulate) a user input device to select a 3D object, such as 3D object 740. The selection may be highlighted or observable via user input device beam 730. In some embodiments, the beam 730 may be a virtual beam and may be directed to a region or object of interest, such as 3D object 740.

FIG. 7C illustrates the 3D object after selection, according to some embodiments. As shown, once 3D object 740 has been selected, it may be dragged-and-dropped onto/into 3D workspace 700 and a more detailed rendering, e.g., 3D object 745 may be displayed at an end of beam 730.

In some embodiments, 3D object 740/745 may be an advertisement transmitted via webpage 720b to an end-user. In some embodiments, the transmitted advertisement may be virtual reality (VR) enabled (e.g., via mechanisms as described herein) and may be selected based on predicted efficacy of the ad content to the end-user. As illustrated in FIG. 7C, in some embodiments the VR advertisement may allow the user to customize or interact with the 3D object (e.g., dragging-and-dropping 3D object 740 and providing more detailed rendering 745). In addition, in some embodiments, user customization and interaction may be reported back to a server for metrics on advertisement interaction levels and efficacy. In some embodiments, interaction levels may be based on where a user is looking (e.g., via head and eye tracking as described above), as well as user interaction with a hand-held or hand-based input device(s) (e.g., such as user input device 600).

Figure 7D:
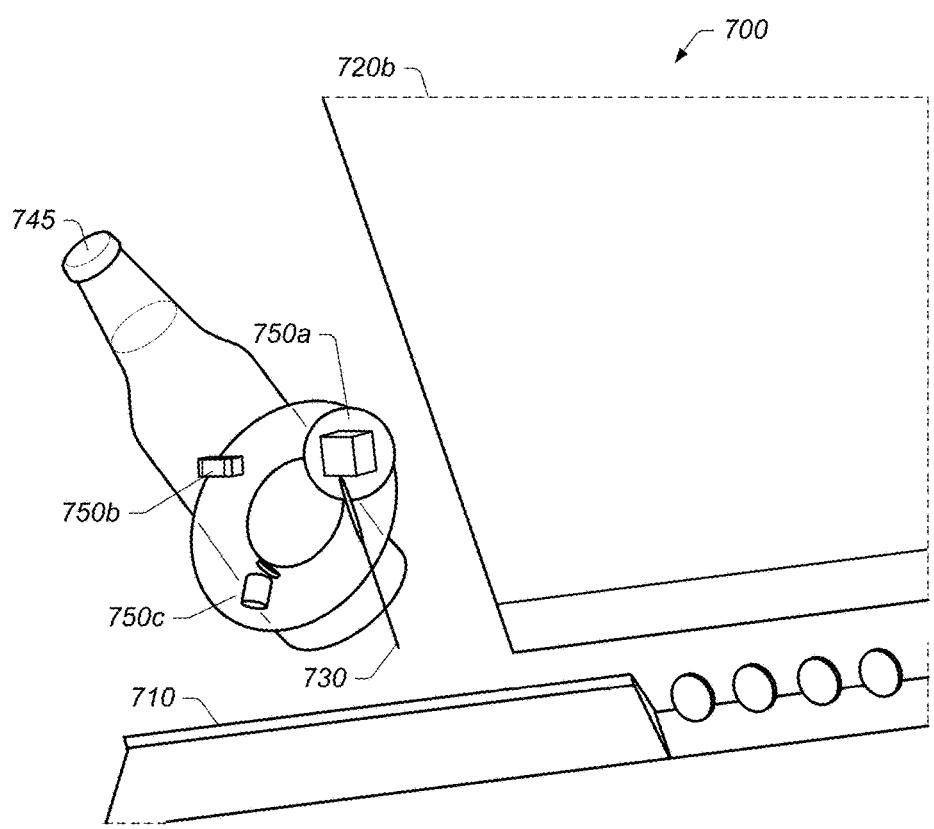

FIG. 7D illustrates a method for initiating 3D printing of the 3D object, according to some embodiments. As shown, a user may enable a menu or heads up display (e.g., a context menu) allowing one or more functions 750a-c, such as 3D print function 750a, store function 750b, or delete function 750c. In other words, 3d objects which have been detached (dragged-and-dropped) from the webpage may have an available context menu (e.g., opened via a user input such as a gesture or alternate click of a user input control), with a choice to 3D print the model directly from the web environment. In some embodiments, a 3D icon representation (e.g., print function 750a) of an available 3D printer and a user may drag-and-drop the 3D object on this representation to initiate a 3D print function. In some embodiments, for 3D content recognized but not yet detached from the webpage, the user may simple activate a 3D print command and may be prompted with a list of available 3D objects to print. In some embodiments, the user may use beam 730 to select 3D print function 750a.

Figure 7E:
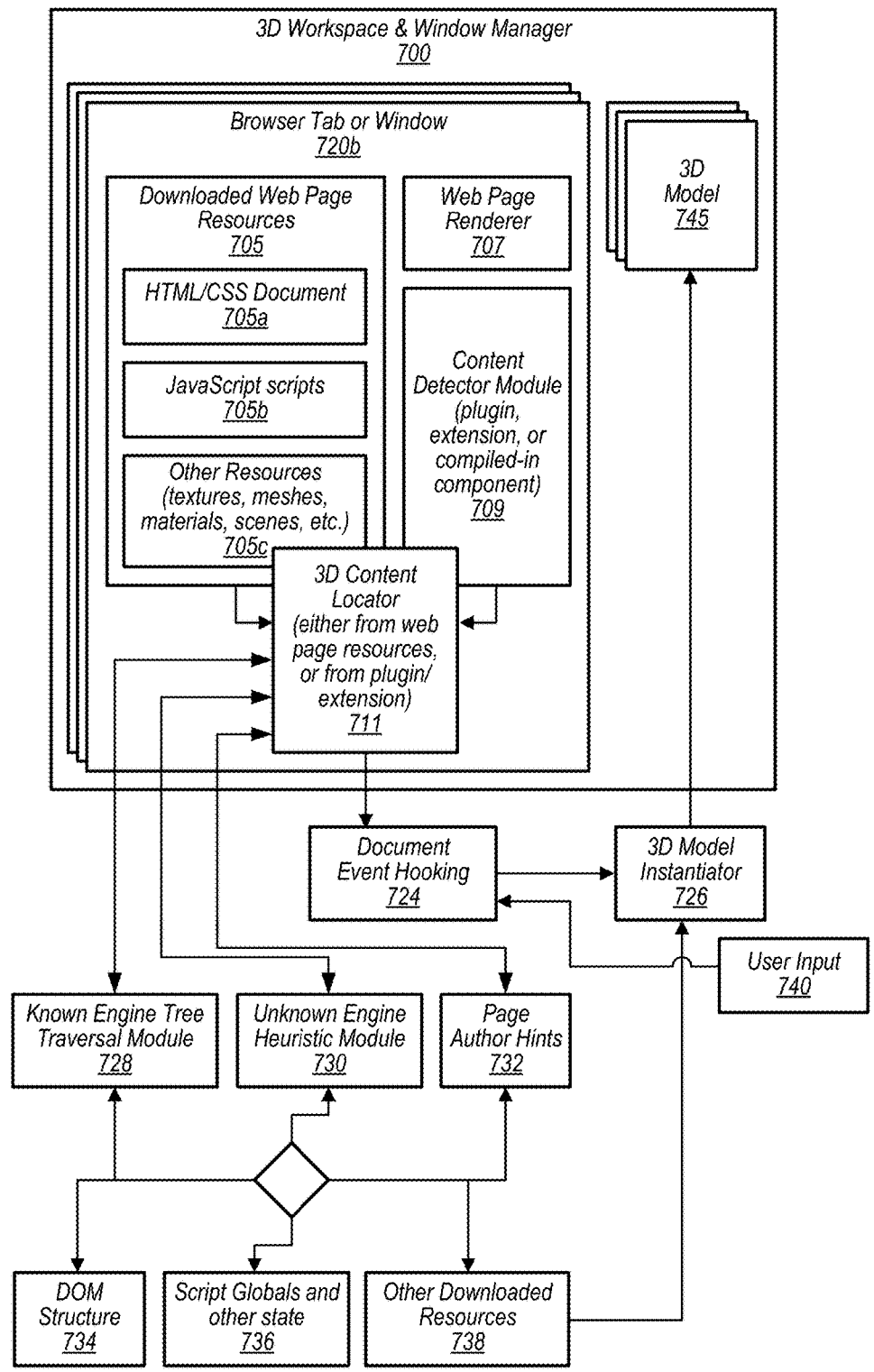
FIG. 7E illustrates a simplified block diagram of an example of a 3D workspace and associated modules, according to some embodiments.

FIG. 7E illustrates a simplified block diagram of an example of a 3D workspace and associated modules, according to some embodiments. As illustrated, for a given webpage loading in a tab or window (e.g., browser tab 720b) of 3D workspace 700, a variety of resources may load with the webpage. For example, hypertext markup language and cascading style sheets resources, such as HTML and CSS 705a, JavaScript scripts 705b, and/or other resources 705c (e.g., such as meshes in JavaScript object notation (JSON) or other formats, images, and/or textures). In addition, a web page renderer 707 and a content locator 711 may be loaded. The content locator 711 may be in the form of one or more JavaScript resources, a plugin, and/or embedded native applet, according to some embodiments. The content locator may be provided by the webpage being loaded by a plugin or extension prebuilt into the web browser (e.g., via content detector module 709), and/or installed by a user as an optional add-in to a web browser.

In some embodiments, the content locator 711 may review and monitor one or more of downloaded and live-updated versions of the webpage (e.g., document object model (DOM) structure and/or markup), and/or an initial and live-updated versions of a JavaScript environment (e.g., global document variables and/or other accessible state data in a scripting environment). In addition, based on the reviewing and monitoring, the content locator may identify new, modified, and/or removed 3D content, shown or unshown (e.g., displayed/rendered or not displayed/not rendered).

In some embodiments, identifying new, modified, and/or removed 3D content may include one or more sub-processes. For example, the sub-processes may include known engine tree traversal module 728, unknown heuristic module 730, and or page author hints 732. The sub-processes may use one or more resources associated with the webpage, such as DOM structure 734, script global variables and other state information 736, as well as other downloaded resources 738 to identify and generate a list of new, modified, and/or removed 3D content. In some embodiments, the one or more sub-processes may be implemented with knowledge of known web standards, de factor standards, and/or in wide use or otherwise specifically targeted 3D engines, 3D scene graphs, and/or 3D rendering libraries or plugins, henceforth referred to as "$3^{rd}$ party 3D library." For example, the downloaded webpage resources may be scanned for presence of such a $3^{rd}$ party 3D library and, a further sub-process (or sub-routine) may be executed for content scanning specific to this $3^{rd}$ party 3D library, e.g., traversing a JavaScript state of the $3^{rd}$ party 3D library's scene graph and resource graph and storing a record of each model discovered.

In some embodiments, unknown engine heuristic module 730 may scan the webpage (e.g., a DOM structure of the webpage) for 3D viewport elements such as canvas elements and may hook into the drawing calls being performed, e.g., to extract data from each geometric element drawn. In some embodiments, unknown engine heuristic module 730 may scan a JavaScript state of a document for keywords or patterns generally, or likely to be, associated with or interpretable as 3D content. In addition, unknown engine heuristic module 730 may store a record of each model discovered.

In some embodiments, page author hints module 732 may scan the webpage (e.g., a DOM structure of the webpage) for element attributes or meta tags which specifically describe 3d content or where to download 3d content associated with the element or element(s) in the webpage, e.g., hints and/or standard and/or de facto standard and/or standardized in the form of DOM extensions webpage. In addition, page author hints module 732 may generate a record of model(s) discovered and store the record.

Content locator 711 may compile the list of new, modified, and/or removed 3D content (e.g., from input from one or more sub-processes as described above) and pass (transmit) the list to document event hooking module 724. Document event hooding module 724 may modify the webpage, e.g., via attachment of scripting callbacks to specific elements from which 3D content was found and/or via attachment of scripting callbacks to the entire webpage. In some embodiments, the scripting callbacks may listen for or detect when a user has interacted with 3D content (e.g., via stylus or user input detection module 740). Note that the 3D content may be currently "flat" or 2D on the webpage and the scripting callbacks may intervene to invoke 3D model instantiator 726 to render 3D model (or object) 745.

In some embodiments, 3D model instantiator 726 may instantiate a description of 3D content found in the webpage, e.g., by reviewing the record of the content and instantiating rendering of 3D model 745 in 3D workspace 700. In some embodiments, 3D model instantiator 726 may review and utilize from the model record one or more of a location of mesh data, a location of texture and shader data (if present), a scale of the mesh data, bounding box dimensions of the mesh data, a location of the webpage element at the time of user action, an orientation of the 3D content (if shown at the time) in the 2D webpage element, a location and orientation of the 3D input device (e.g., a user input device such as a stylus or more generally, user input device 600). Based on the record, 3D model instantiator 726 may render the 3D model 745 such that the 3D model 745 is placed (located) relative to the 3D input device to achieve a seemingly smooth and consistent effect of pulling the model (2D or 3D) out of the webpage into stereoscopic 3D.

In some embodiments, if not all content has been downloaded, a placeholder mesh may be instantiated, e.g., while a background download begins of the mesh and/or a placeholder texture may be used for an already downloaded mesh, e.g., while a background download begins of the texture. In some embodiments, object pulling from the webpage may be immediate when the stylus is activated on the object or embedded viewport and/or may be deferred until a grab with a pulled distance of sufficient threshold is crossed. In some embodiments, the object may scale up or scale down as (or after) it is grabbed from the webpage. In some embodiments, the object may be upgraded to stereoscopic 3D substantially immediately (e.g., prior to user interaction). In some embodiments, the object may remain in monoscopic 3D until pulled out of the webpage. In some embodiments, the monoscopic object may be a 3D model or a thumbnail of a 3D model, e.g., as dictated inherently in the webpage with 3D model data hidden or unused initially. In some embodiments, the 3D model data may contain animations (or may be animated prior to the grab) and may continue to animate after the pull out of the webpage. In some embodiments, the pulled object (e.g., 3D model 745) may be a clone of the content seen in the webpage or may be the actual (only user-visible copy) of the content seen in the webpage. In some embodiments, the pulled object, if not a clone, may be able to be deleted and not restored until the user refreshes the page and/or may be deleted and not restored until the user activates the original webpage element again or with a special action. In some embodiments, the pulled object, after pulled and otherwise interacted with in the workspace, may be able to be placed back on the webpage, e.g., by grabbing the object and moving it to be within the original zone of placement in the webpage and releasing the grab action. In some embodiments, the 3D model, if shown immediately in stereoscopic 3D and not yet grabbed, may scroll with the webpage as if attached to the webpage and may be cropped by the bounds of the webpage 2D viewport, e.g., by using 3D clipping planes (aligned to webpage 2D viewport) on the 3D model.

Figure 7F:
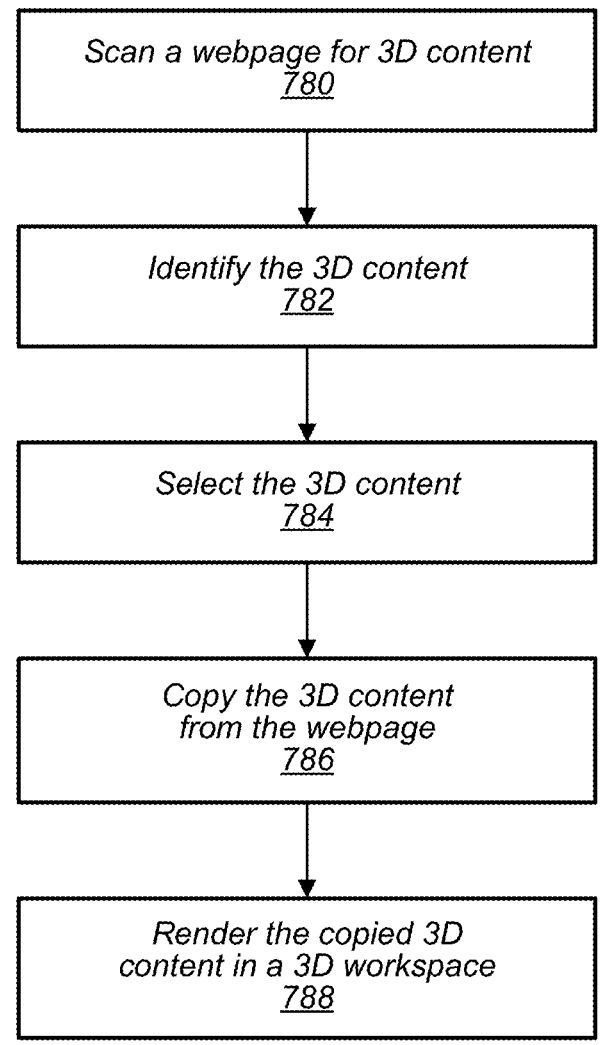
FIG. 7F illustrates a block diagram of an example of a method for dragging an object from a webpage, according to some embodiments.

FIG. 7F illustrates a block diagram of another example of a method for dragging an object from a webpage, according to some embodiments. The method shown in FIG. 7F may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 780, a webpage (or a webpage structure) may be scanned for objects, such as two-dimensional (2D) or three-dimensional (3D) content (native or non-native). In some embodiments, at least one instance of 3D content (e.g., an embedded JavaScript, a nested JavaScript, one or more uniform resource locators, and/or one or more plugin-based viewers) may be identified within the webpage or webpage structure.

At 782, an object, such as 2D or 3D content may be identified. In some embodiments, at least one instance of 2D or 3D content may be identified. In some embodiments, identifying the object may include reviewing and monitoring one or more of downloaded and live-updated versions of the webpage (e.g., document object model (DOM) structure and/or markup), and/or an initial and live-updated versions of a JavaScript environment (e.g., global document variables and/or other accessible state data in a scripting environment). In some embodiments, based on the reviewing and monitoring, the identifying the object may include identifying new, modified, and/or removed 3D content, shown or un-shown (e.g., displayed/rendered or not displayed/not rendered).

At 784, the object may be selected. In some embodiments, the object may be selected via first user input, e.g., via a user input device as described above. For example, at least one instance of 3D (or 2D) content may be selected responsive to user input. The user input may include one or more of a detected gesture of a user and/or a detected selection via a virtual beam projected from a user input device.

At 786, the object may be copied from the webpage (or webpage structure). In some embodiments, the at least one instance of 3D (or 2D) content may be copied from the webpage, e.g., as described above At 788, the object may be rendered in a 3D workspace. In some embodiments, the object may be rendered in the 3D workspace responsive to second user input, e.g., via a user input device as described above. For example, the at least one instance of 3D (or 2D) content may be rendered in the 3D workspace responsive to the second user input. The second user input may include one or more of a detected gesture of a user and/or a detected selection via a virtual beam projected from a user input device. In some embodiments, rendering the at least one instance of 3D content may include rendering the 3D content based (at least in part) on one or more of a location of mesh data, a location of texture and shader data (if present), a scale of the mesh data, bounding box dimensions of the mesh data, a location of the webpage element at the time of user action, an orientation of the 3D content (if shown at the time) in the 2D webpage element, a location and orientation of a user input device when user input is received.

In some embodiments, user input may be received after rendering the object in the 3D workspace and the user input may alter the rendering of the object. For example, the object may be enlarged (proportionally or along a specified axis) or reduced (proportionally or along a specified axis).

In some embodiments, the object may be an advertisement. For example, an instance of 3D content in the webpage (or webpage structure) may be an advertisement. Additionally, in such embodiments, feedback regarding user input (e.g., selecting the advertisement) may be provided to a server hosting the advertisement. The feedback may be usable for metrics on advertisement interaction levels and efficacy.

In some embodiments, instructions may be provided to a printer to print the object. In some embodiments, the object may be 3D content and the printer may be a 3D printer. Thus, the instructions may include instructions for 3D printing the 3D content.

FIGS. 8A-8E: Extracting Images from a Webpage

Figure 8A:
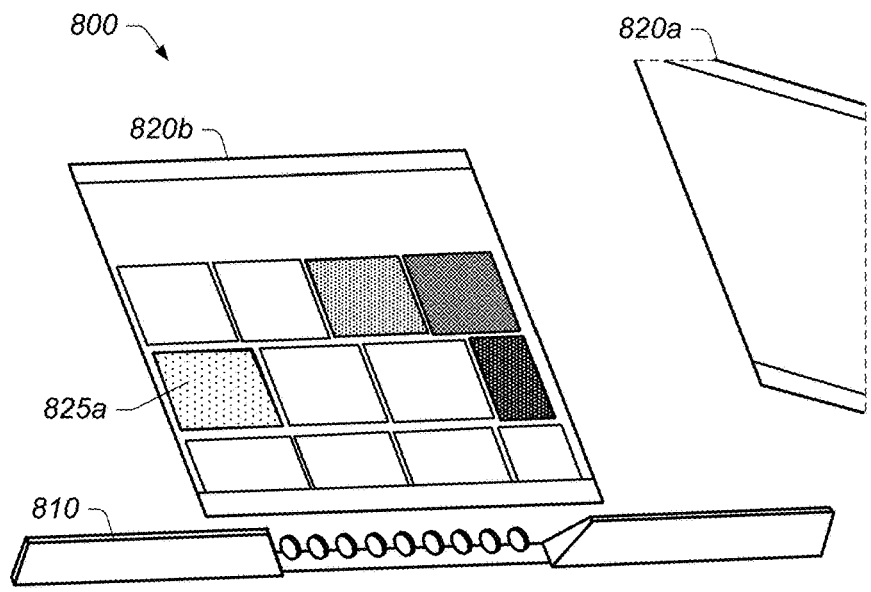
FIGS. 8A-8D illustrate an example of a method for identifying, selecting, and dragging images from a webpage, according to some embodiments.
Figure 8B:
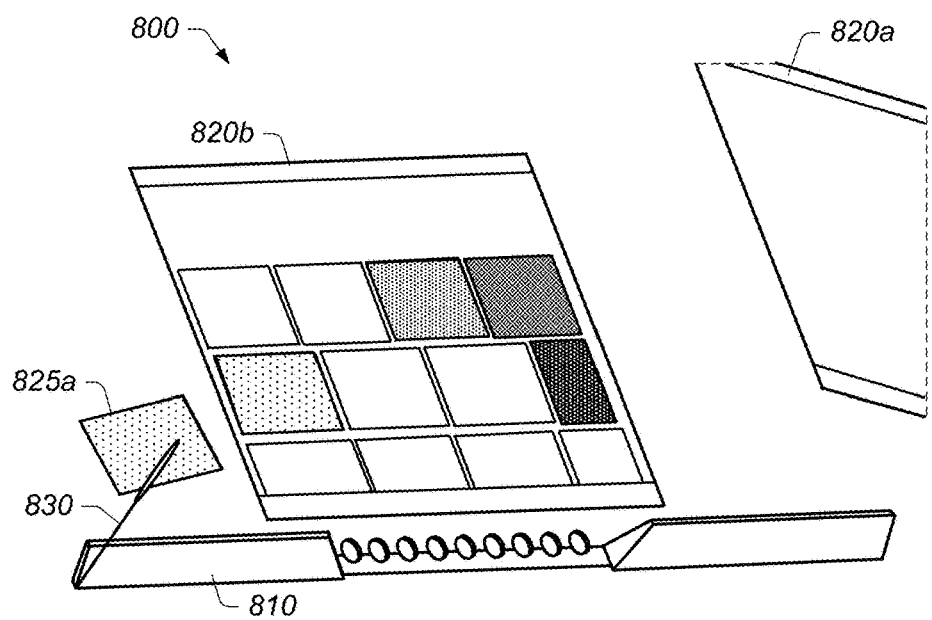
Figure 8C:
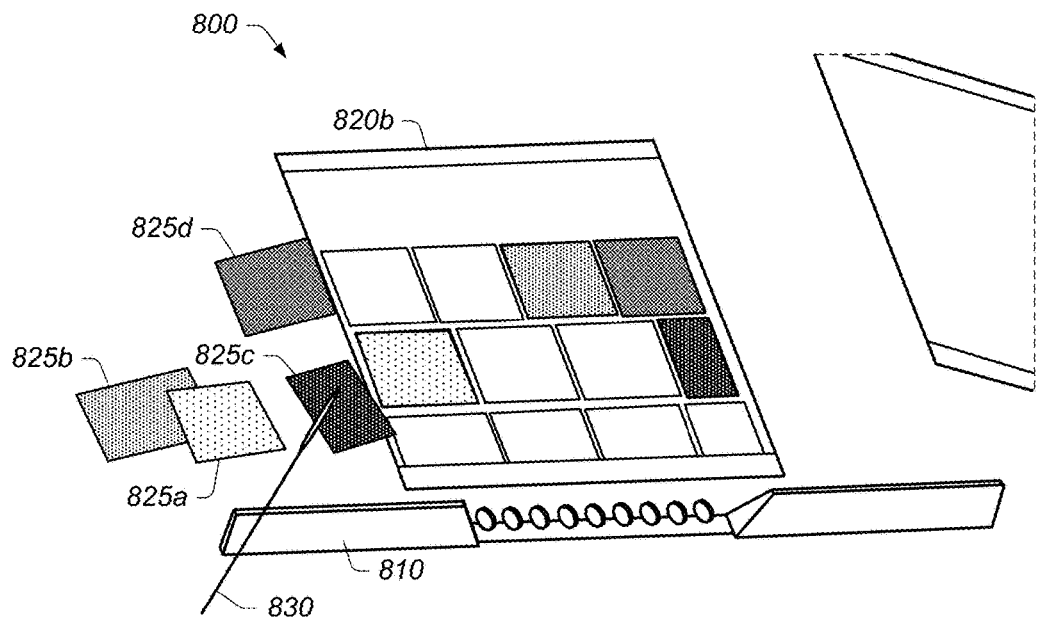
Figure 8D:
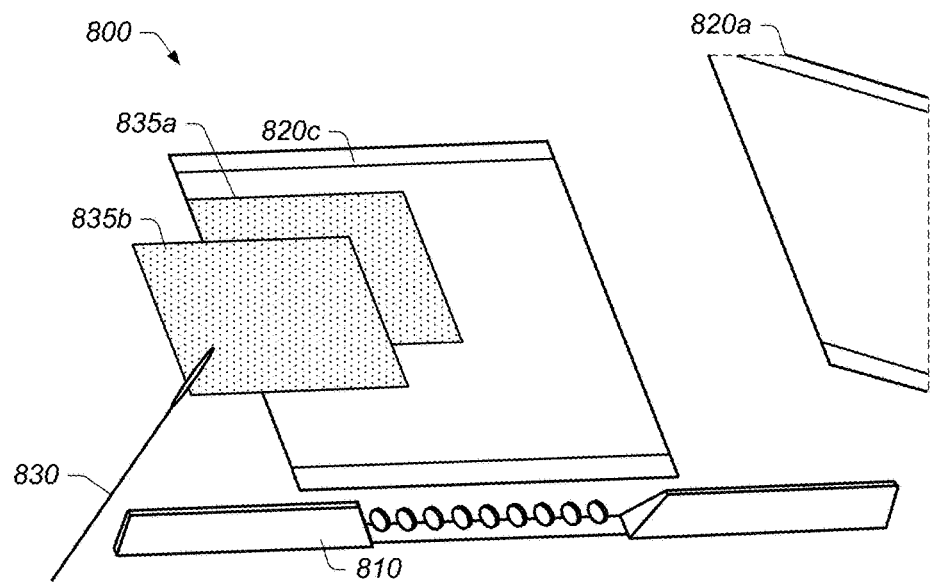

As described above, in some embodiments, one or more images (2D or 3D) may be dragged-and-dropped from the webpage and arranged in the 3D workspace. FIGS. 8A-8C illustrate an example of a method for identifying, selecting, and dragging a 3D image from a webpage, according to some embodiments. FIG. 8D illustrates an example of a method for identifying, selecting, and dragging a 3D video from a webpage, according to some embodiments. Note that the method may be implemented on or with any of the systems or devices described above.

As illustrated at FIG. 8A, a three-dimensional (3D) workspace, such as 3D workspace 800 may include a task bar, such as task bar 810, and may display an internet browser that includes one or more windows, such as windows 820*a-b*, displaying one or more webpages. The windows 820*a-c* may be arranged within 3D workspace 800 such that a user may toggle or scroll from window 820*a* to 820*b* via a user input command (e.g., via a command from an input device, such as user input device 600 described above). In some embodiments, a webpage structure (e.g., a markup or DOM tree), such as the webpage structure displayed in window 820*b*, may be scanned or analyzed to find images (e.g., such as image 825*a*) and associated locations within the webpage structure.

Turning to FIG. 8B, the image (e.g., image 825*a*) may be dragged from window 820*b* into 3D workspace 800. The image dragged from window 820*b* may be a clone or copy of the image. In some embodiments, an input device, such as input device 830 (which may be similar to input device 130 and 600 described above) may be used to drag and clone the image from webpage 820*b* to workspace 800. In some embodiments, dragging and cloning of the images may be initiated via a user input command via a keyboard (e.g., via an associated modifier key) or other input device (e.g., via a button on the input device). In some embodiments, dragging and cloning of the images may be initiated via a gesture (e.g., via detection of a user movement).

In addition, as illustrated at FIG. 8C, multiple images (e.g., images 825*a-d*) may be dragged and cloned from webpage 820*b* into 3D workspace 800. In some embodiments, an input device may be used to arrange the clone images within 3D workspace 800.

In some embodiments, as illustrated at FIG. 8D, the image may be a video, such as video 835*a*, and the video may be cloned (e.g., copied) into 3D workspace 800, e.g., as video 835*b*.

FIGS. 9A-9D: Visualization of Embedded 3D Images

Figure 9A:
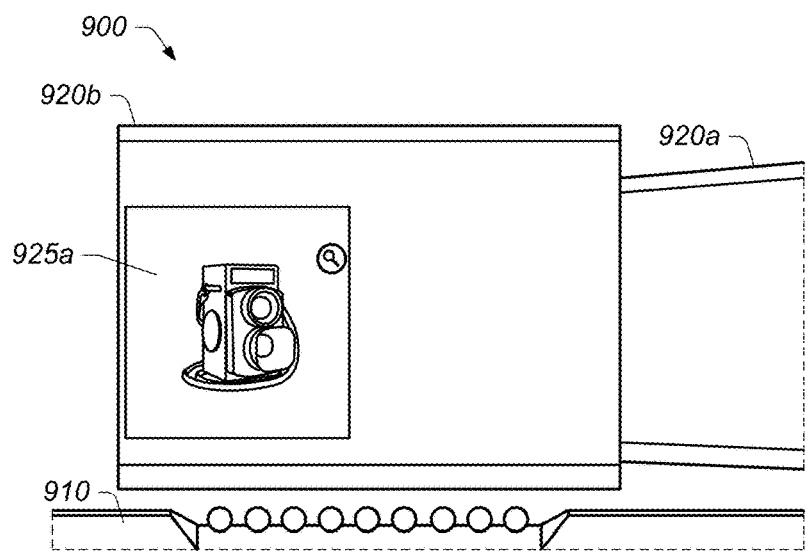
FIGS. 9A-9C illustrate an example of a method for visualizing the set of stereoscopic images and/or lightfield data set, according to some embodiments.
Figure 9B:
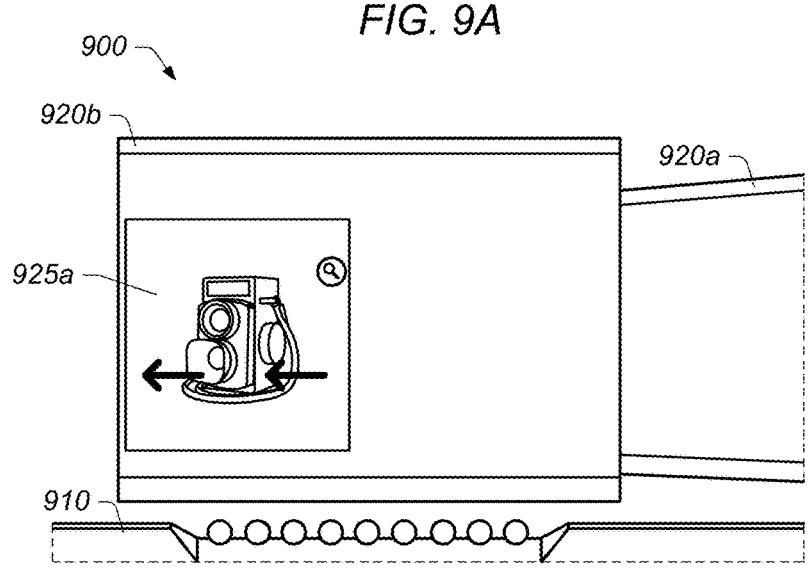
Figure 9C:
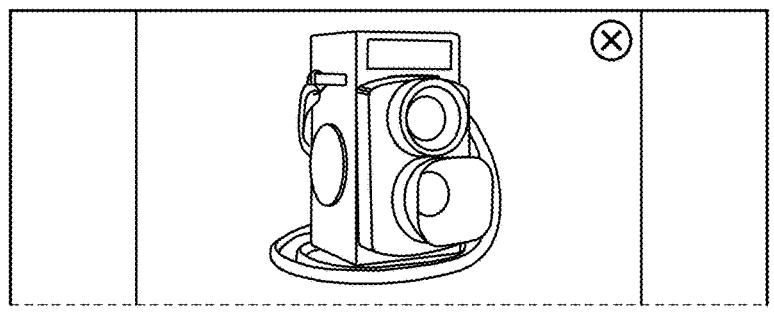

In some embodiments, a 2D internet document may include stereoscopic 360-degree images (or a set of images or photos and/or video) and these images may be visualized and interacted with within the 3D internet browser and/or within the 3D workspace. In other words, methods may enable 3D visualization and interaction with a 360-degree set of stereoscopic images or lightfield data set provided in a 2D internet document. FIGS. 9A-9C illustrate an example of a method for visualizing the set of stereoscopic images and/or lightfield data set, according to some embodiments. Note that the method may be implemented on or with any of the systems or devices described above.

As illustrated at FIG. 9A, a three-dimensional (3D) workspace, such as 3D workspace 900 may include a task bar, such as task bar 910, and may display an internet browser that includes one or more windows, such as windows 920*a-b*, displaying one or more webpages. The windows 920*a-b* may be arranged within 3D workspace 900 such that a user may toggle or scroll from window 920*a* to 920*b* via a user input command (e.g., via a command from an input device, such as user input device 600 described above). In some embodiments, a webpage structure (e.g., a markup or DOM tree), such as the webpage structure displayed in window 920*b*, may be scanned or analyzed to find a set of images (e.g., such as image 925*a*) and associated locations within the webpage structure. In some embodiments, the set of images may be a set of images allowing a 360-degree view of an object within the images. In other words, the set of images may allow various vantage points (or viewpoints) of the object. In some embodiments, analyzing and finding (or identifying) the set of images may include implementation of a heuristic to detect how images are grouped as a single 360-degree set, scanning of markup indicating the images are grouped as a single 360-degree set, and/or identifying an embedded 360-degree video (which acts as an image set).

As illustrated at FIG. 9B, a user may interact with the object and provide an input to rotate the object to the left of the user (as denoted by block arrows 930*a-b*). The user input may be via a gesture or via input from a user control device (e.g., such as input device 600 described above). In some embodiments, the set of stereoscopic images may be viewed as a 3D image and the input and the user input may allow for a change in viewpoint of the object or animate the object.

As illustrated at FIG. 9C, a user may provide input to magnify a view of the object. In other words, a user may provide user input via a gesture or other command (e.g., via an input device) that allows the object to be magnified.

Figure 9D:
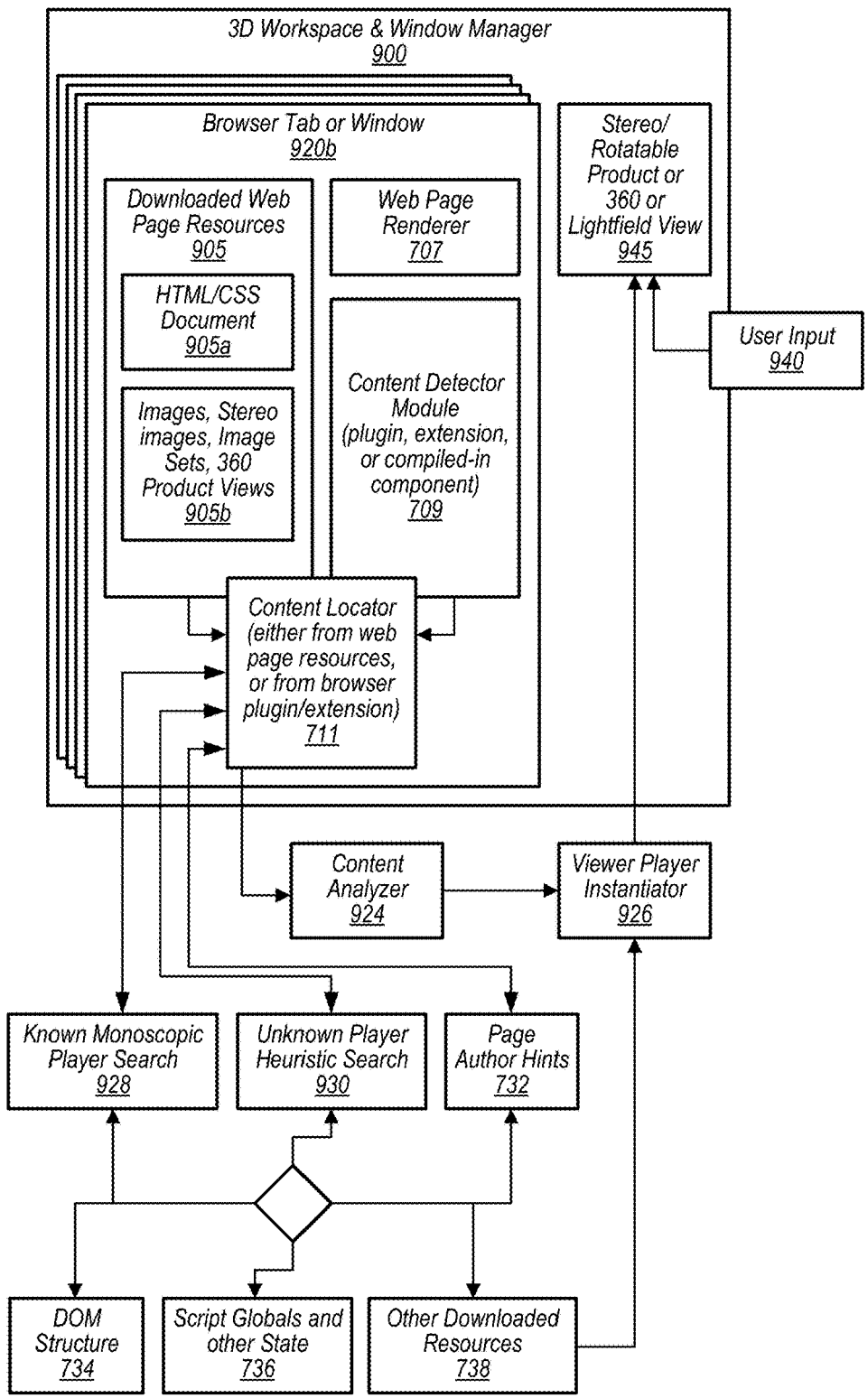
FIG. 9D illustrates a simplified block diagram of an example of a 3D workspace and associated modules for visualization and interaction with a 360-degree set of images and/or lightfield data set provided in a 2D internet document, according to some embodiments.

FIG. 9D illustrates a simplified block diagram of an example of a 3D workspace and associated modules for visualization and interaction with a 360-degree set of images and/or lightfield data set provided in a 2D internet document, according to some embodiments. As illustrated, for a given webpage loading in a tab or window (e.g., browser tab 920*b* of 3D workspace 900, a variety of resources may load with the webpage. For example, hypertext markup language and cascading style sheets resources, such as HTML and CSS 905*a* and/or images 905*b* (e.g., such as sets of images, stereo images, 360-degree product views, videos of images sequences and so forth). In addition, a web page renderer 707 and a content locator 711 may be loaded. The content locator 711 may be in the form of one or more JavaScript resources, a plugin, and/or embedded native applet, according to some embodiments. The content locator may be provided by the webpage being loaded by a plugin or extension prebuilt into the web browser (e.g., via content detector module 709), and/or installed by a user as an optional add-in to a web browser.

In some embodiments, the content locator 711 may review and monitor one or more of downloaded and live-updated versions of the webpage (e.g., document object model (DOM) structure and/or markup), and/or an initial and live-updated versions of a JavaScript environment (e.g., global document variables and/or other accessible state data in a scripting environment). In addition, based on the reviewing and monitoring, the content locator may identify new, modified, and/or removed compatible content, shown or un-shown (e.g., displayed/rendered or not displayed/not rendered).

In some embodiments, identifying new, modified, and/or removed compatible content may include one or more sub-processes. For example, the sub-processes may include known monoscopic player search 928, unknown player heuristic search 930, and or page author hints 732. The sub-processes may use one or more resources associated with the webpage, such as DOM structure 734, script global variables and other state information 736, as well as other downloaded resources 738 to identify and generate a list of new, modified, and/or removed compatible content. In some embodiments, the one or more sub-processes may be implemented with knowledge of known web standards, de factor standards, and/or in wide use or otherwise specifically targeted rotatable and/or lightfield image viewers and/or video players, e.g., via scanning for presence of such a viewer (e.g., in loaded JavaScript objects and/or DOM traversal) and/or via execution of a further sub-routine for content scanning specific to this format or player, e.g., traversing JavaScript states and/or storing a record of each model discovered.

In some embodiments, unknown player heuristic search 930 may scan the webpage (e.g., a DOM structure of the webpage) for images loaded on the webpage (e.g., possibly hidden and/or preloaded) and performing a client-side analysis of the images to determine if the images can be interpreted as a set of rotatable stereo images or lightfield images, e.g., through a similarity analysis and/or computer vision analysis of the images. In some embodiments, unknown heuristic search 930 may scan a JavaScript state of the webpage for keywords or patterns generally and/or likely to be associated with and/or interpretable as rotatable image sets or lightfield sets. In some embodiments, a record of each model discovered may be stored.

In some embodiments, page author hints 732 may scan the webpage (e.g., a DOM structure of the webpage) for hints and/or standard and/or de facto standard and/or industry-standardized markup in a form of a DOM extension(s) (e.g., additional element attributes and/or meta tags which may specifically describe rotatable stereoscopic 3D content and/or where to download 3D content associated with the element or element(s) in the webpage). In some embodiments, a record of a discovered model(s) may be stored.

Content locator 711 may compile the list of new, modified, and/or removed compatible content (e.g., from input from one or more sub-processes as described above) and pass (transmit) the list to viewer player instantiator 926. View player instantiator 926 may instantiate a player into the webpage, initialized with the located content to render a rotatable image (e.g., such as stereo/rotatable product, 360-degree image, or lightfield view 945). In some embodiments, one player may be loaded for each content, image set, and/or lightfield set found. In some embodiments, instantiating the player may include ordering unordered images (e.g., based, at least in part on analysis from content locator 711) for stereo viewing. In some embodiments, instantiating the player may include wrapping, rendering, and/or re-rendering output of an existing monoscopic 3D viewer on the webpage, rendering twice (once for each eye) to produce a stereoscopic view, and rerouting input events to update the existing viewer's state for correct, ongoing re-rendering. In some embodiments, instantiating the player may include reading from the image set (if ordered or described in detail already) and/or from the lightfield dataset referenced to generate rendered images.

In some embodiments, if not all content has been downloaded, restrictions on rotations/view-perspective may be temporarily in effect, e.g., while a background downloading continues. In some embodiments, if not all content has been downloaded, a placeholder blurred output (blurred of finished loading images) used temporarily for perspectives not yet loaded, e.g., while a background download begins of the texture. In some embodiments, rotation interactions with the mouse, gesture, or stylus (e.g., via user input 940) may have momentum, such that releasing a hold action while moving results in the object continuing to spin for a specified duration, e.g., based on the moving. In some embodiments, the object may be upgraded to stereoscopic 3D substantially immediately (e.g., prior to user interaction) or the object may remain in monoscopic 3D until hovered over or clicked or interacted with by the user. In some embodiments, a level of binocular parallax may be adjusted by the user (e.g., in cases where the image set or lightfield set lacks parallax or camera baseline or inter-pupillary distance (IPD) information and/or where the image set or lightfield set lacks a comfortable or compatible baseline or IPD in the source material for the instantiated viewer). In some embodiments, a level of binocular parallax may be adjusted automatically, e.g., content analyzer 924 may determine via image analysis that the level of parallax or image separation is too high to be comfortable for the user and adjust for zero or near zero mean parallax. In some embodiments, where image samples may be missing due to sparsity in the image set, a blending or surface analysis and surface reprojection may be performed, e.g., via viewer player instantiator 926. In some embodiments, the instantiated player may adjust stereo image sampling/blending according to a location of the user' head (e.g., from head tracking) and/or may remain rendered head-independent.

In some embodiments, the instantiated player may choose one or more images or subsets of the data to be presented to the left eye stereoscopic output and again independently for the right eye stereoscopic output. The instantiated player may repeat choosing the one or more images or subsets of the data according to a decided perspective (e.g., from head position or fixed) and querying the data set of images or lightfield data based on the decided perspective.

Figure 9E:
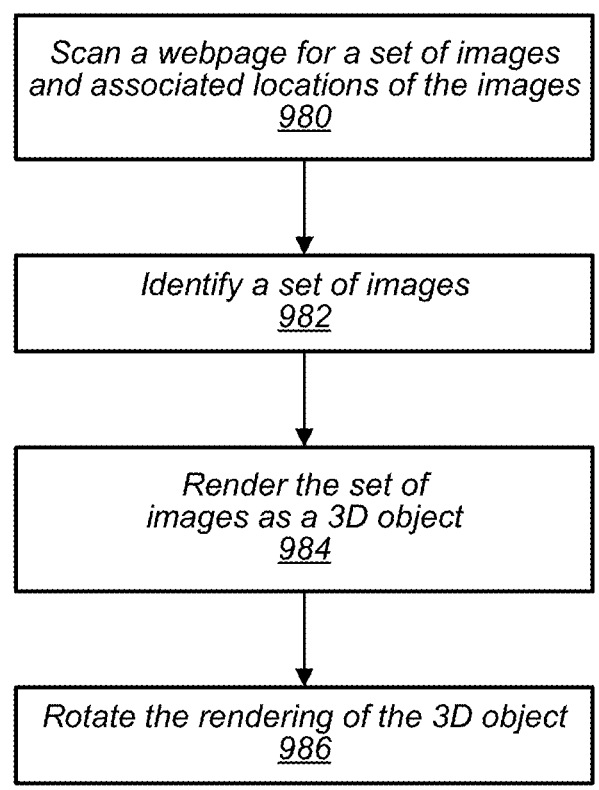
FIG. 9E illustrates a block diagram of an example of a method for visualization and interaction with a 360-degree set of stereoscopic images and/or lightfield data set provided in a 2D internet document, according to some embodiments.

FIG. 9E illustrates a block diagram of an example of a method for visualization and interaction with a 360-degree set of stereoscopic images and/or lightfield data set provided in a 2D internet document, according to some embodiments. The method shown in FIG. 9D may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 980, a webpage (e.g., a 2D internet document) may be scanned for a set of images and associated locations of the images. In some embodiments, scanning the webpage may include scanning a structure of the webpage. In some embodiments, the webpage structure may be a 2D webpage structure.

At 982, a set of images may be identified. In some embodiments, each image of the set of images may be from a different viewpoint.

At 984, the identified set of images may be rendered as a 3D object. In some embodiments, rendering the set of images as the 3D object may include instantiating a player into the webpage, initialized with the located content to render a rotatable image (e.g., such as stereo/rotatable product, 360-degree image, or lightfield view). In some embodiments, one player may be loaded for each content, image set, and/or lightfield set found. In some embodiments, instantiating the player may include ordering unordered images for stereo viewing. In some embodiments, instantiating the player may include wrapping, rendering, and/or re-rendering output of an existing monoscopic 3D viewer on the webpage, rendering twice (once for each eye) to produce a stereoscopic view, and rerouting input events to update the existing viewer's state for correct, ongoing re-rendering. In some embodiments, instantiating the player may include reading from the image set (if ordered or described in detail already) and/or from the lightfield dataset referenced to generate rendered images.

At 986, the rendering of the 3D object may be rotated, e.g., responsive to user input. In some embodiments, user input may include one or more of a detected gesture of a user and/or a detected selection via a virtual beam projected from a user input device.

In some embodiments, the rendering of the 3D object may be animated response to user input, such as one or more of a detected gesture of a user and/or a detected selection via a virtual beam projected from a user input device. In some embodiments, the rendering of the 3D object may be magnified (e.g., enlarged) responsive to user input, such as one or more of a detected gesture of a user and/or a detected selection via a virtual beam projected from a user input device.

In some embodiments, instructions may be provided to a printer to print the 3D object. In some embodiments, the printer may be a 3D printer. Thus, the instructions may include instructions for 3D printing the 3D object.

Figure 10A:
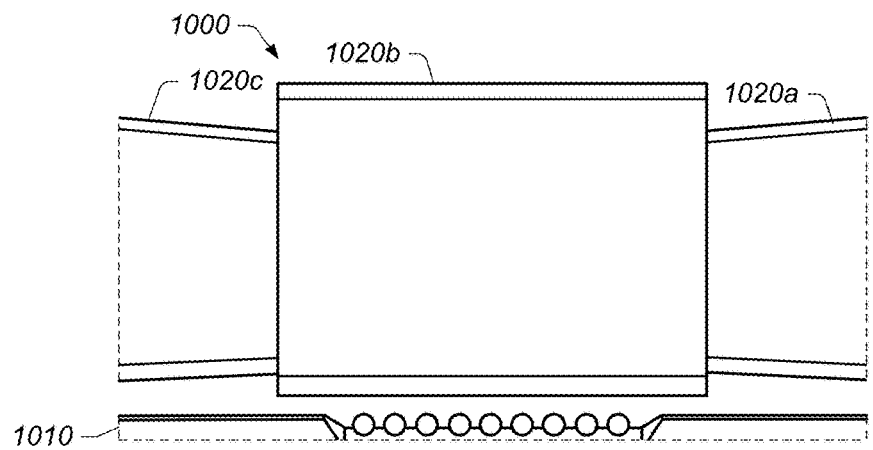
FIGS. 10A-10C illustrate an example of tabs of a 3D internet browser being rearranged within a 3D workspace, according to some embodiments.
Figure 10B:
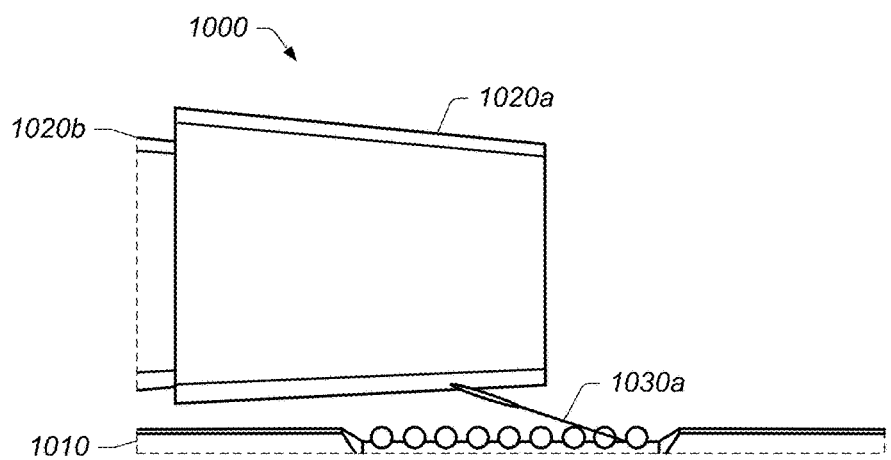
Figure 10C:
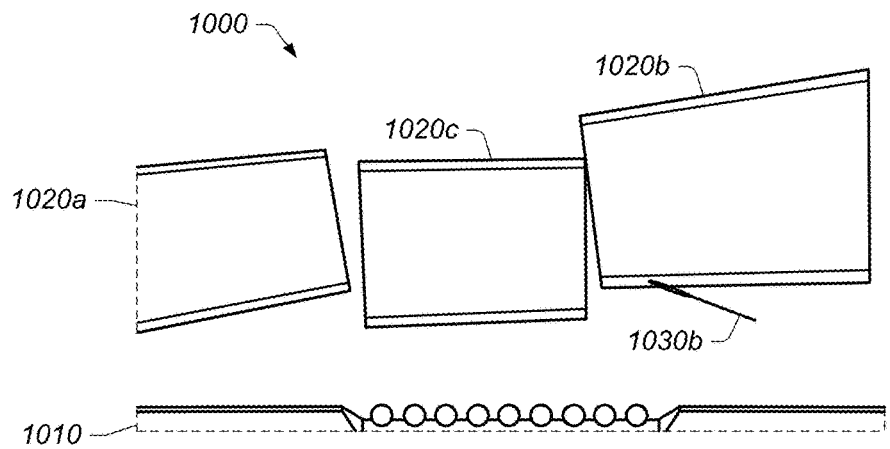

FIGS. 10A-10C: 3D Web Browser Environment

As described above, in some embodiments, the 3D internet browser may include multiple windows and/or portions accessible via selection of tabs. In other words, the 3D internet browser (or 3D workspace) may be a tab-based internet browser where tabs of the internet browser exist in a 3D workspace. Thus, the tabs (or windows) may be auto-arrange within the 3D workspace and/or may be manually placed in custom arrangements based on user input from a user input device or pre-saved configurations. In some embodiments, a user may activate various methods of automatic tab arrangement, such as sorting all tabs spatially in the workspace according to page title (a-z), tab time opened (newest-oldest), page first visited (newest-oldest), and/or frequency of visit (most-least). In some embodiments, a user may visualize a browsing history using tabs and the described sorting. FIGS. 10A-10C illustrate an example of tabs of a 3D internet browser being re-arranged within a 3D workspace, according to some embodiments. Note that the method may be implemented on or with any of the systems or devices described above.

As illustrated at FIG. 10A, a three-dimensional (3D) workspace, such as 3D workspace 1000 may include a task bar, such as task bar 1010, and may display an internet browser that includes one or more windows or tabs, such as tabs 1020a-c, displaying one or more webpages.

As illustrated at FIG. 10B, tabs 1020a-c may be rearranged within 3D workspace 1000 via a user input command 1030a (e.g., via a command from an input device, such as user input device 600 described above) such that tab 1020c is not visible and tab 1020b is at least partially obscured by tab 1020a.

As illustrated at FIG. 10C, tabs 1020a-c may be again rearranged within 3D workspace 1000 via a user input command 1030b such that tab 1020c is moved between tabs 1020a and 1030b.

FIGS. 11A-11C and 12A-B: Detection and Conversion to Stereoscopic Display

Figure 11A:
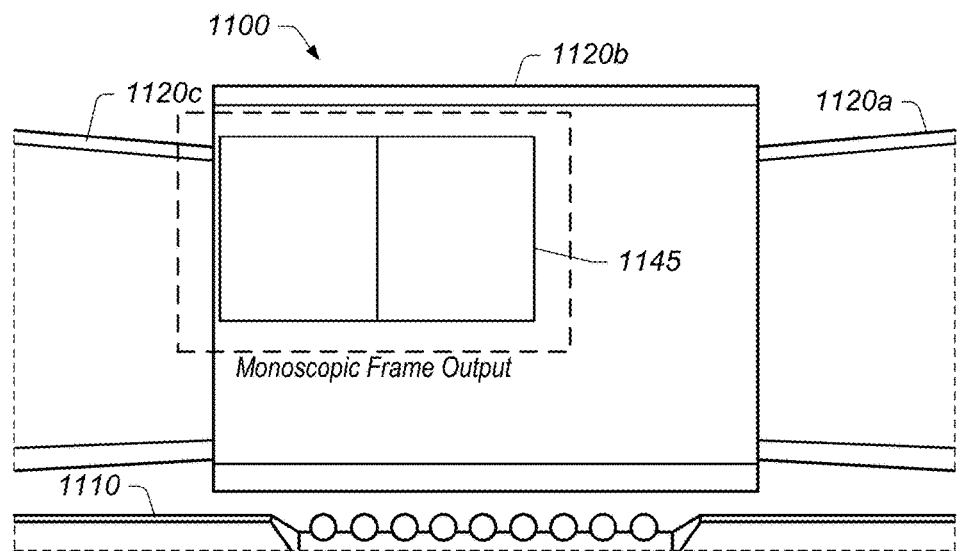
FIGS. 11A-11B illustrate an example a method of converting side-by-side photos into a stereoscopic frame output, according to some embodiments.
Figure 11B:
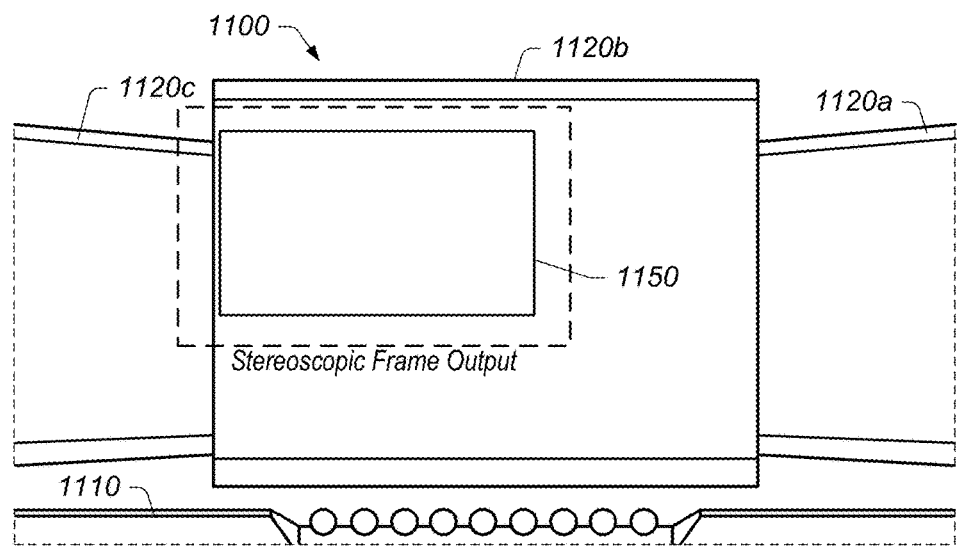
Figure 11C:
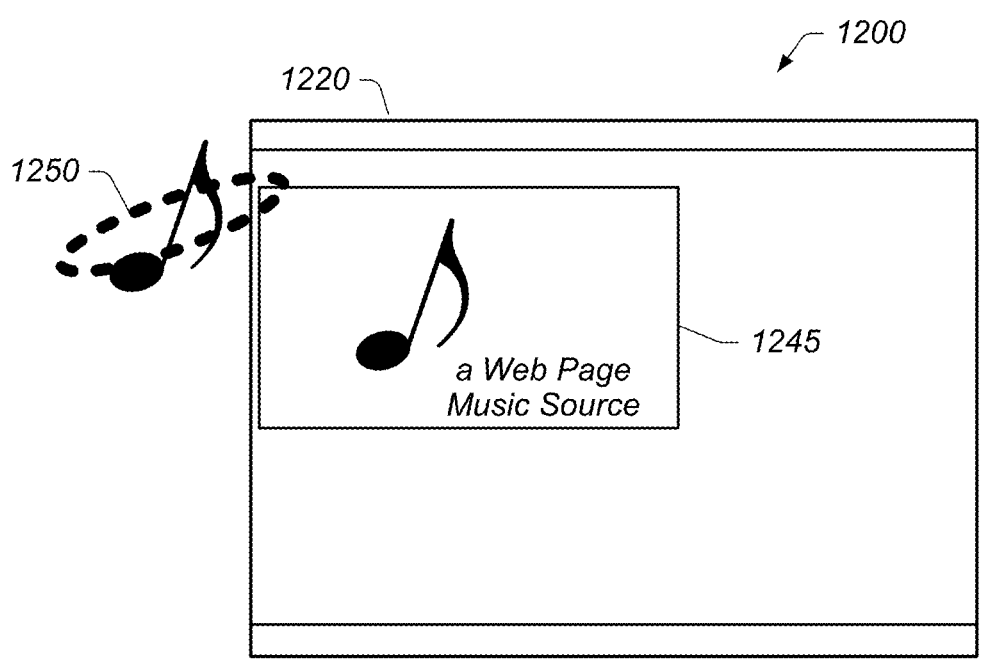
FIG. 11C illustrates an example of a method of converting an internet audio file into a 3D sound spectrum visualization, according to some embodiments.

As described above, in some embodiments, the 3D workspace may automatically convert windowed, side-by-side photos, videos, and/or HMD 3D content to frame-sequential stereo 3D format. In some embodiments, the 3D workspace may automatically convert windowed, anaglyph photos and/or videos in an internet document to frame-sequential stereo 3D format. In some embodiments, an internet audio file's sound spectrum may be visualized in the 3D workspace. The visualization may be in real-time. FIGS. 11A-11B illustrate an example a method of converting side-by-side photos into a stereoscopic frame output, according to some embodiments. FIG. 11C illustrates an example of a method of converting an internet audio file into a 3D sound spectrum visualization, according to some embodiments. Note that the method may be implemented on or with any of the systems or devices described above.

As illustrated at FIG. 11A, a three-dimensional (3D) workspace, such as 3D workspace 1100 may include a task bar, such as task bar 1110, and may display an internet browser that includes one or more windows or tabs, such as tabs 1120a-c, displaying one or more webpages. In particular, tab 1120b may display a side-by-side stereoscopic video such as monoscopic frame output 1145. In some embodiments, stereoscopic images, video, and real-time 3D graphics (or graphics objects) may be included in a 2D webpage using non-natively stereoscopic formats, e.g., such as side-by-side, interleaved, and/or anaglyph and may be detected by the 3D web browser. In some embodiments, the detection may be based on at least one of (or one or more of) a real-time image analysis heuristic, a HTML/markup analysis heuristic, and/or specific tags/indicators from the content.

As illustrated at FIG. 11B, the 3D web browser, based in part on the detection, may up-convert monoscopic frame output 1145 to stereoscopic output 1150. In some embodiments, a region of the tab 1120b that includes monoscopic frame output 1145 may have additional post-processing (e.g., buffering and resampling) prior to being rendered. In other words, the conversion to stereoscopic output 1150 may include additional post-processing prior to rendering as compared to other portions of tab 1120b.

Turning to FIG. 11C, a three-dimensional (3D) workspace, such as 3D workspace 1200 may display an internet browser that includes one or more windows or tabs, such as tab 1220. Tab 1220 may include a music source 1245. In some embodiments, upon playback of the music source, 3D workspace 1200 may display (e.g., render) a 3D visualization of the music. In some embodiments, the 3D visualization may be in the form of a stylized spectrum analyzer or other visualization procedurally driven by music source 1245 and appearing in 3D in 3D workspace 1200.

Figure 12A:
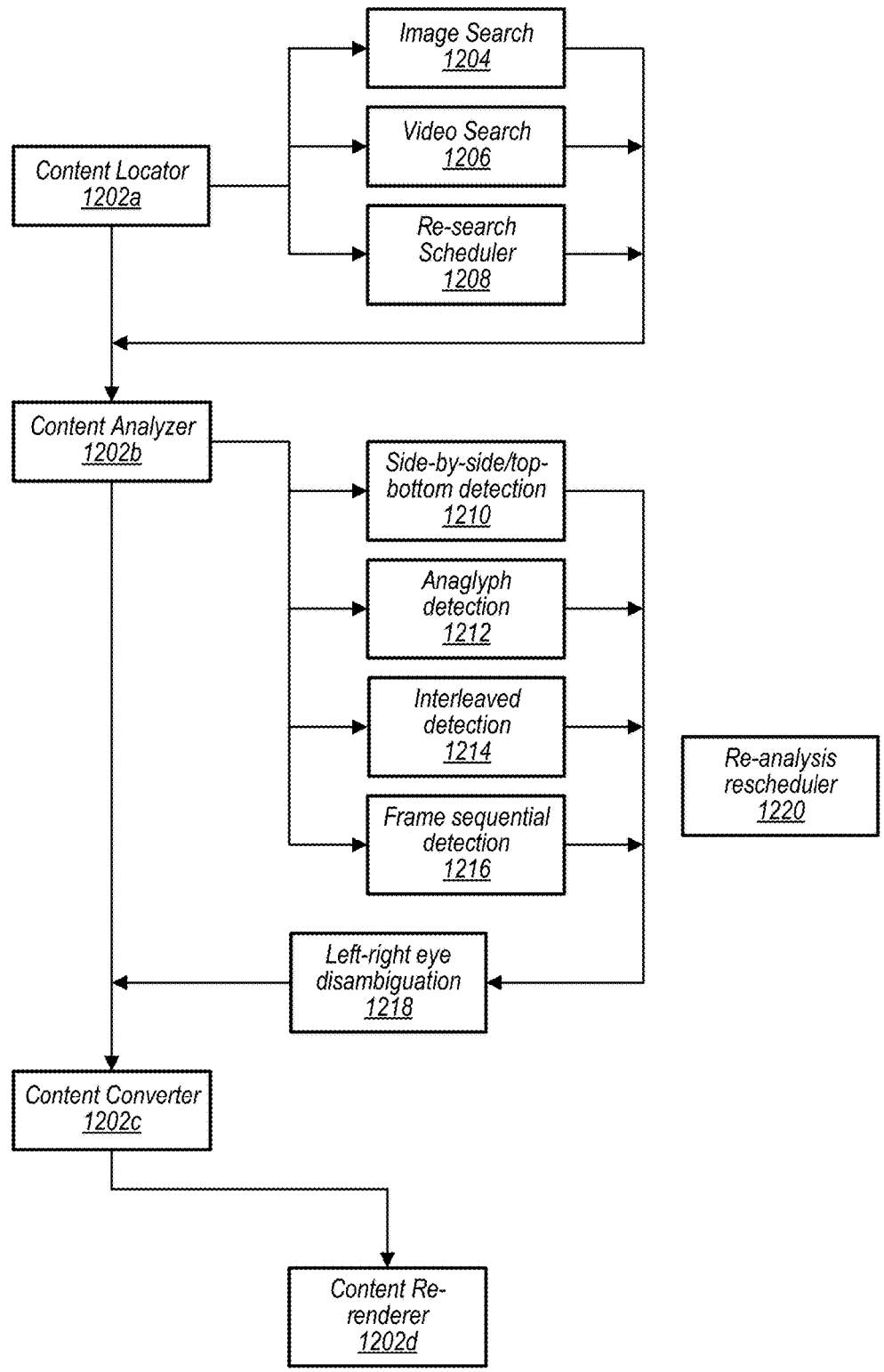
FIGS. 12A and 12B illustrate block diagrams of examples of methods for converting a non-native stereoscopic image embedded in a 2D webpage to a 3D stereoscopic image within a 3D workspace, according to some embodiments.
Figure 12B:
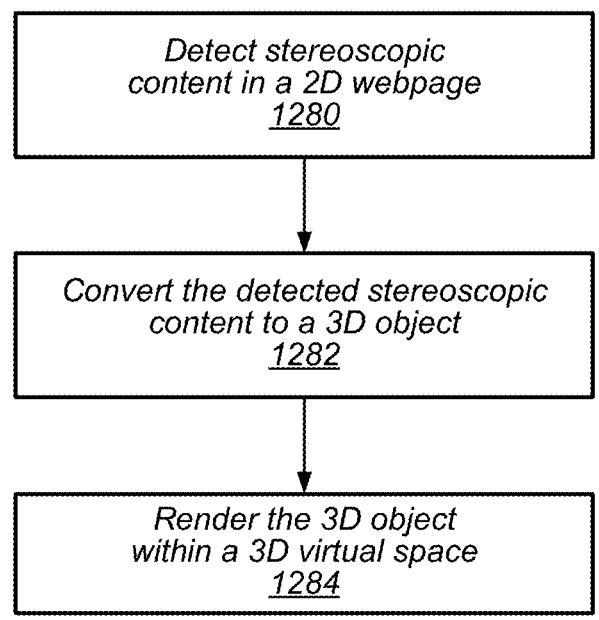

FIGS. 12A and 12B illustrate block diagrams of examples of methods for converting a non-native stereoscopic image embedded in a 2D webpage to a 3D stereoscopic image within a 3D workspace, according to some embodiments. The methods shown in FIGS. 12A-B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, method illustrated by FIG. 12A may operate as follows.

A content locator module 1202a may begin a content location process. The content locator process may include a search for images (e.g., image search module 1204), a search for videos (e.g., video search module 1206). In some embodiments, the searches may include scheduling a re-search process (e.g., via re-search scheduler module 1208) for dynamic changes to a webpage that may occur after the webpage loads.

Results of the searches may be passed to a content analyzer module 1202b. Content analyzer 1202b may analyze the search results (e.g., content found via the searches), searching for content such as side-by-side material, anaglyph material, top-bottom material, interleaved material, and frame sequential material, e.g., via processes such as side-by-side/top bottom detection module 1210, anaglyph detection module 1212, interleaved detection module 1214, and/or frame sequential detection module 1216. In some embodiments, content analysis may occur over a period of time or periodically, e.g., if the content is video content. In some embodiments, the content analysis may vary based on content type. For example, side-by-side content may be detected via DOM information (e.g., heuristics such as nearby or sole elements with side-by-side language or acronyms in text or URLs and/or via image analysis of combined images, e.g., via overlapping of cut halves and computation of distance error measures, accepting as side-by-side or top-bottom for sufficiently low error values). As another example, anaglyph may be detected via similar techniques, except rather than spatial separation prior to error computation a variety of color channel separations are performed prior to error computation. As a further example, interleaved images may be detected via odd/even separation and/or error minimization.

In some embodiments, DOM and/or URL heuristics and/or hints may be consulted in addition to and/or instead of image analysis. In some embodiments, content using specific tags defined by standards or de facto standards, or industry specific standards, may authoritatively define the content format.

Detection results may then be passed to a left-right eye disambiguation module 1218 to check that left and right eye images do not output as swapped prior to being passed to content converter module 1202c. In other words, content which has been identified to be in one of the formats detected by content analyzer module 1202b may be fed to content converter module 1202c for conversion. In some embodiments, conversion may vary based on content type. For example, for side-by-side content, left and right halves may be sampled separately and resized into a new stereo image buffer. As another example, interleaved content may be sampled from odd and even lines and image filtering may be used to counter-act unwanted compression artifacts associated with odd-even line encoding. As a further example, anaglyph resampling may sample monochromatic information from each eye, e.g., using monochromatically correct information preserved in color encoding, and resulting color channels or color vectors may have pixel magnitudes extracted and dropped into left and right image buffers of a new stereo image. In addition, the image results may be interpreted as black and white stereo images. In some embodiments, if original color, monoscopic versions of the images, or videos are present in the webpage (or downloaded content and/or locatable elsewhere via hyperlink or heuristic), the monoscopic color version of the images may be sampled to restore approximate stereo color information. As yet another example, frame sequential resampling may first use buffering and left/right image analysis (including parallax measurement or image flow measurement) to determine whether two sequential frames are part of a stereo pair, and the sample/re-buffer the images.

Finally, the converted content is sent to a content player such as content re-renderer module 1202d. In some embodiments, the content player may have been instantiated into the webpage, either replacing, wrapping, or layered in front of an original source material located on the webpage. The content player may be fully stereo, either via plugin or via stereoscopic compositing support by a browser, and as such thereafter appears in stereoscopic 3D.

Turing to Figured 12B, at 1280 stereoscopic content may be detected in a 2D webpage. In some embodiments, the stereoscopic content may be detected in a 2D webpage structure. In some embodiments, the stereoscopic content may include one or more of stereoscopic images, stereoscopic video, and/or a real-time 3D object. In some embodiments, the stereoscopic content may be in a non-natively stereoscopic formation such as a side-by-side format, a top-bottom format, an interleaved format, and/or an anaglyph.

At 1282, the detected stereoscopic content may be converted to a 3D object. In some embodiments, converting the 3D object may include buffering and resampling the stereoscopic content. In some embodiments, conversion may vary based (at least in part) on a format type of the stereoscopic content. In some embodiments, for a side-by-side format type, left and right halves may be sampled separately and resized into a new stereo image buffer to convert the stereoscopic content. In some embodiments, for an interleaved format type, the stereoscopic content may be sampled from odd and even lines and image filtering may be used to counter-act unwanted compression artifacts associated with odd-even line encoding to convert the stereoscopic content. In some embodiments, for an anaglyph format type, resampling may sample monochromatic information from each eye, e.g., using monochromatically correct information preserved in color encoding, and resulting color channels or color vectors may have pixel magnitudes extracted and dropped into left and right image buffers of a new stereo image to convert the stereoscopic content. In addition, the image results may be interpreted as black and white stereo images. In some embodiments, if original color, monoscopic versions of the images, or videos are present in the webpage (or downloaded content and/or locatable elsewhere via hyperlink or heuristic), the monoscopic color version of the images may be sampled to restore approximate stereo color information. In some embodiments, for a frame sequential format type, resampling may first use buffering and left/right image analysis (including parallax measurement or image flow measurement) to determine whether two sequential frames are part of a stereo pair, and the sample/re-buffer the images to convert the stereoscopic content.

At 1284, the 3D object may be rendered within a 3D virtual space. In some embodiments, rendering the 3D object within the 3D virtual space (or workspace) may include replacing, wrapping, or layering in front of an original source material located on the webpage the rendering of the 3D object.

In some embodiments, instructions may be provided to a printer to print the object. In some embodiments, the object may be 3D content and the printer may be a 3D printer. Thus, the instructions may include instructions for 3D printing the 3D content.

FIGS. 13A-D: 3D Model Download

As described above, in some embodiments, internet documents within the 3D workspace may be edited (or modified) via attachment of virtual notes (e.g., virtual Post-it® notes). Internet documents may also be analyzed within the 3D workspace for 3D mesh data. Further, the 3D workspace may automatically present 3D mesh data in stereoscopic 3D. In some embodiments, a 3D model file may be downloaded (e.g., saved to a local location from a remote location) from a 3D browser to the 3D workspace and immediately (or substantially immediately) rendered in its 3D form. FIGS. 13A-D illustrate a method for detecting download of a 3D model and rendering the 3D model within the 3D workspace, according to some embodiments. Note that the method may be implemented on or with any of the systems or devices described above.

Figure 13A:
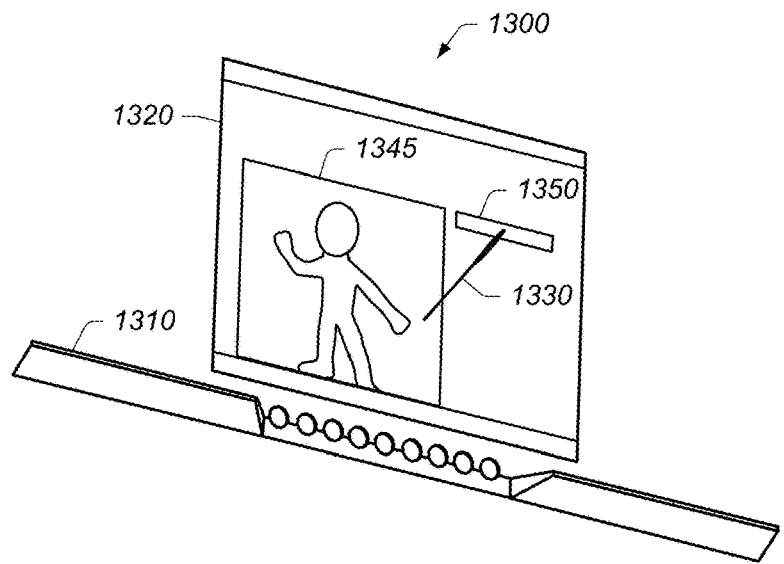
FIGS. 13A-D illustrate a method for enabling and detecting download of a 3D model and rendering the 3D model within the 3D workspace, according to some embodiments.

As illustrated at FIG. 13A, a three-dimensional (3D) workspace, such as 3D workspace 1300 may include a task bar, such as task bar 1310, and may display an internet browser that includes one or more windows or tabs, such as tab 1320, displaying one or more webpages. In particular, tab 1320 may display a representation of a 3D model, such as representation 1345 and may also include a link (or button) 1350 for downloading the 3D model. The user may select link 1350, e.g., via a user input device controlling virtual beam 1330.

Figure 13B:
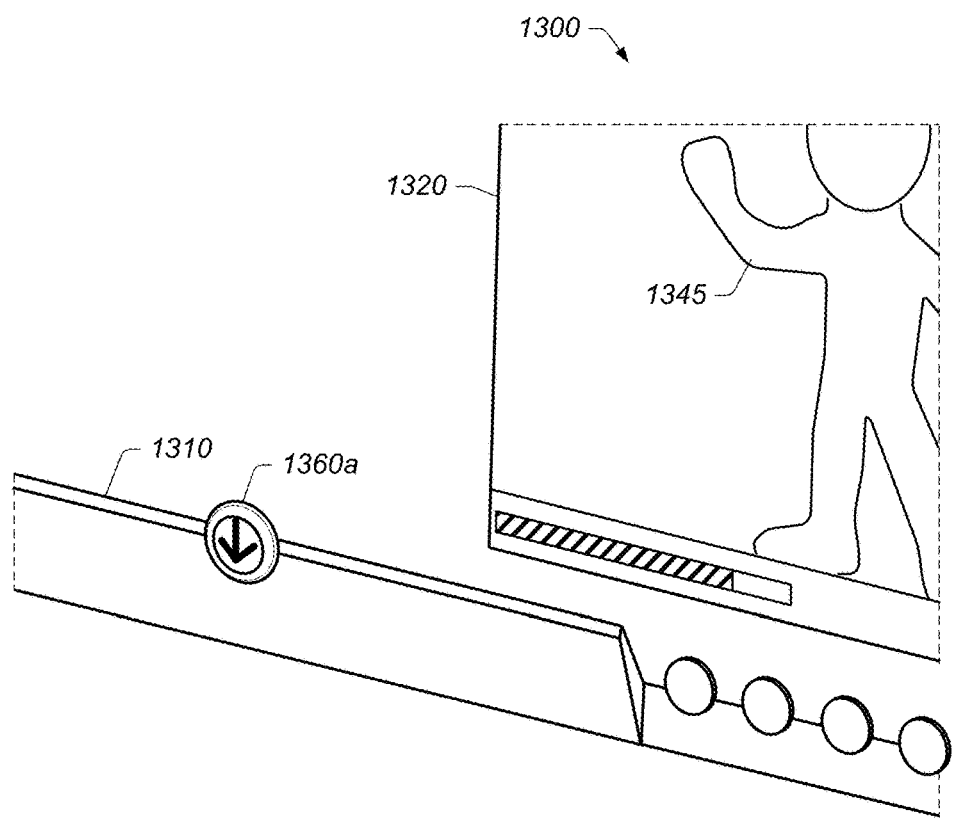

As illustrated at FIG. 13B, the 3D workspace may detect that a 3D model is being downloaded and may insert a 3D object 1360a to represent the 3D model within the 3D workspace during the download.

Figure 13C:
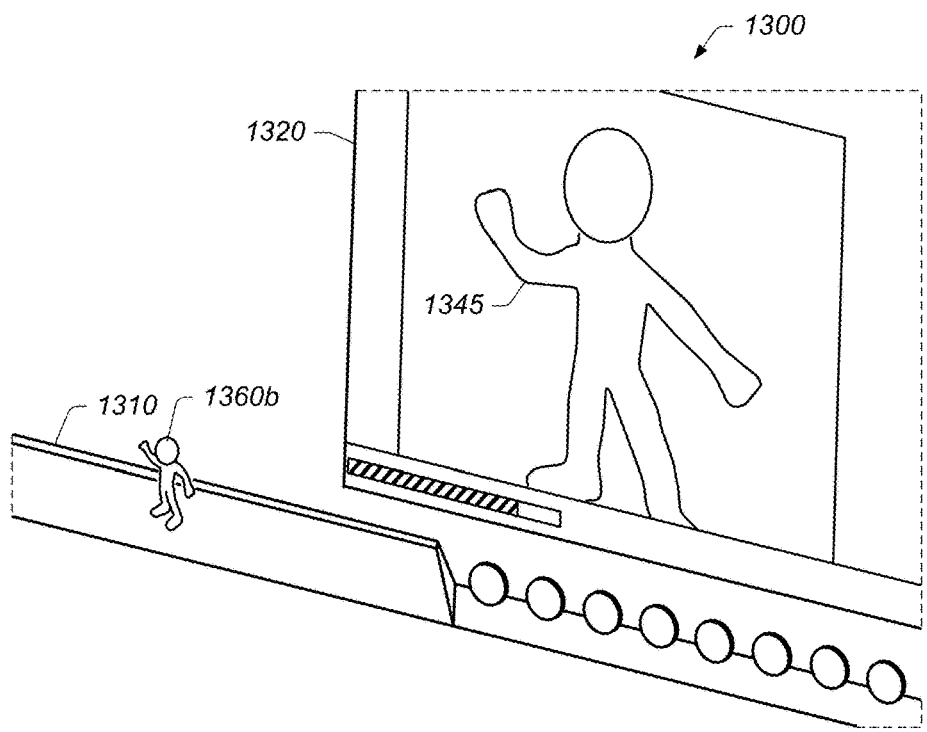

As illustrated at FIG. 13C, upon completion of downloading the 3D model, the 3D model may be automatically displayed within the 3D workspace as 3D object 1360b. Note that 3D object 1360b may be rendered substantially immediately upon completion of the downloading of the 3D model.

Figure 13D:
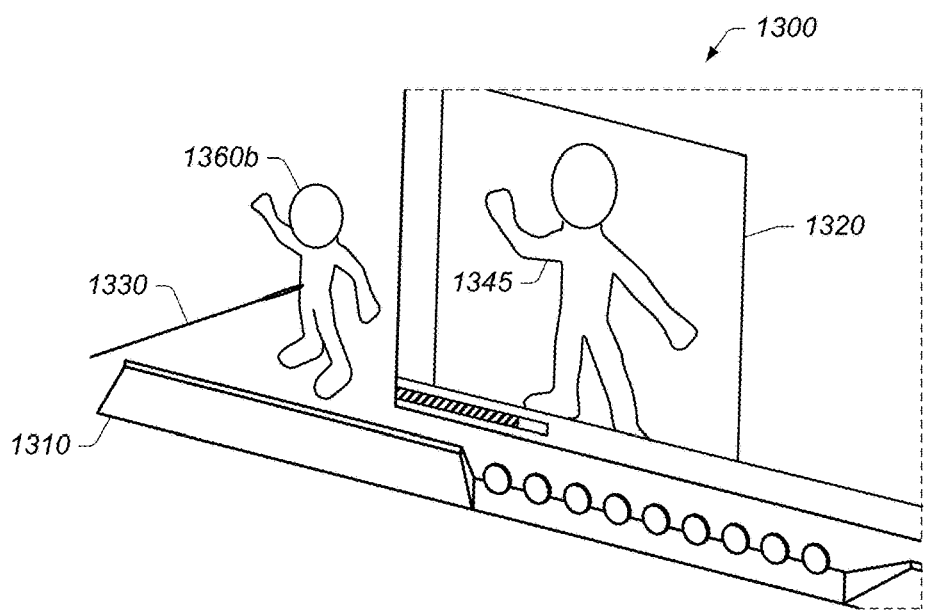

Finally, as illustrated at FIG. 13D, a user may interact with (e.g., manipulate) 3D object 1360b via a user input device controlling virtual beam 1330. Note that in some embodiments, interaction with 3D object 1360b may occur via gestures and/or other input device commands.

Figure 14A:
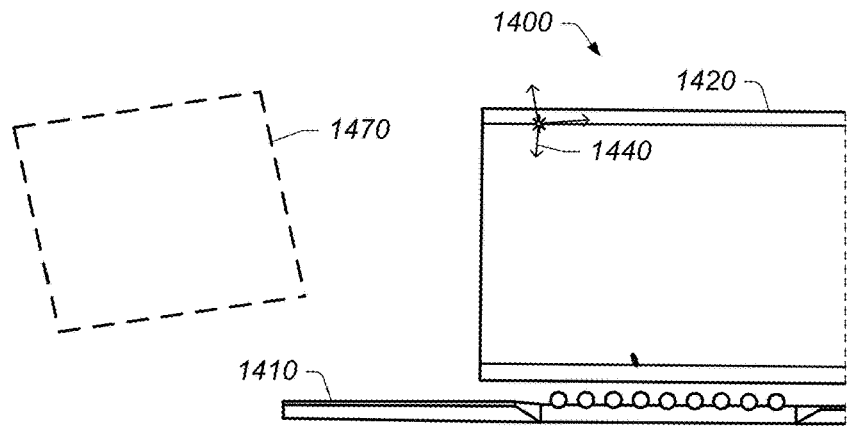
FIGS. 14A-C illustrate an example of a method for bookmarking a webpage via placement of the webpage within a designated portion of a 3D workspace according to some embodiments.
Figure 14B:
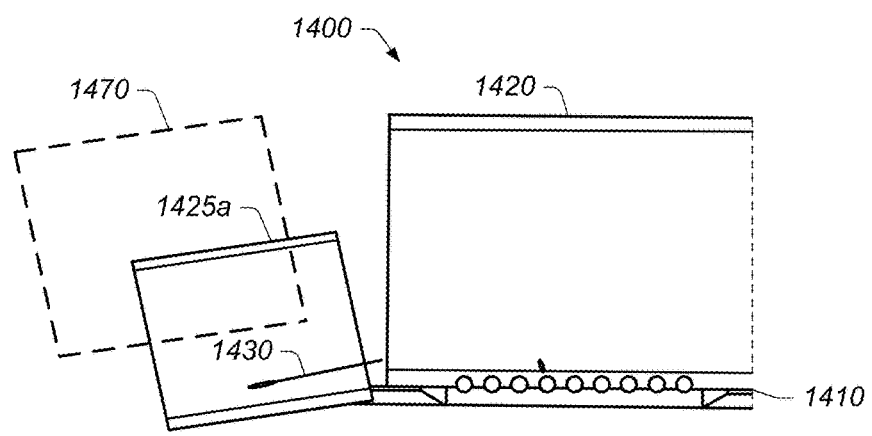
Figure 14C:
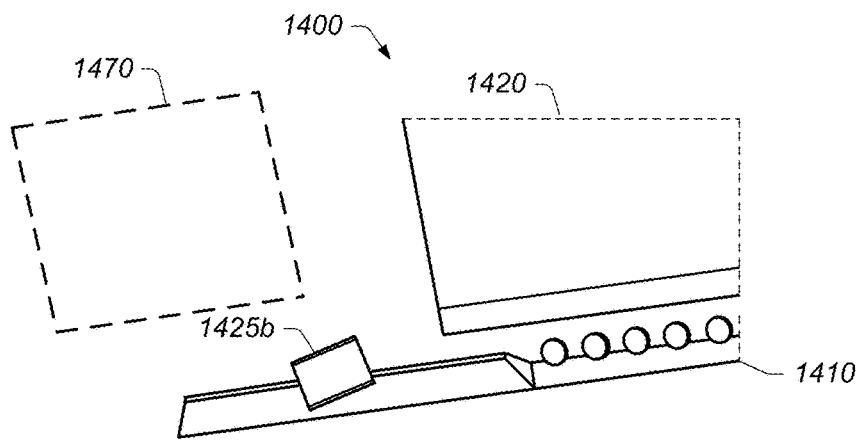

FIGS. 14A-C: Bookmarking a Webpage

As described above, in some embodiments, internet documents may be bookmarked (or tagged/flagged/saved) and may further be placed ("dragged-and-dropped") into a portion of the 3D workspace. Additionally, one or more internet video or audio playlists may be visualized and managed in the 3D workspace. In addition, in some embodiments, the 3D workspace may include internet documents and/or objects and may be saved, restored, and/or shared. The 3D workspace may also include navigation and/or searching of a browser history using 3D arrangements of a user's historical navigation and/or searching data. FIGS. 14A-C illustrate an example of a method for bookmarking a webpage via placement of the webpage within a designated portion of a 3D workspace according to some embodiments. Note that the method may be implemented on or with any of the systems or devices described above.

As illustrated at FIG. 14A, a three-dimensional (3D) workspace, such as 3D workspace 1400 may include a task bar, such as task bar 1410, and may display an internet browser that includes one or more windows or tabs, such as tab 1420, displaying one or more webpages. In some embodiments, a user may select tab 1420 via a user input device (e.g., such as user input device 600) and may move tab 1420 as illustrated by directional arrows 1440. In particular, tab 1420 may be moved within 3D workspace 1400, including a region 1470 of 3D workspace 1400 designated for preserving (e.g., saving or bookmarking) tab 1420.

As illustrated at FIG. 14B, a user may move a 3D object 1425a representative of tab 1420 at least partially within region 1470, e.g., via directing a virtual beam 1430 to region 1470. In response, 3D workspace 1400 may save and/or bookmark tab 1420 for subsequent viewing and/or retrieval.

As illustrated at FIG. 14C, once save and/or bookmarked, 3D workspace 1400 may display a 3D object 1425b representative of tab 1420 within task bar 1410.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by a processor to:
   display, via at least one display in communication with the processor, a two-dimensional (2D) internet document, wherein the 2D internet document comprises 2D content and three-dimensional (3D) content, wherein the 3D content is embedded within a 2D webpage structure of the 2D internet document;
   analyze the 2D webpage structure for a set of images and associated locations of the images within the webpage structure, wherein each image of the set of images is from a different viewpoint;
   identify at least one set of images, wherein the at least one set of images correspond to the 3D content, and wherein the at least one set of images allow a 360-degree view of an object within the at least one set of images;
   render, via the at least one display, the set of images as a 3D object, including ordering unordered images within the set of images for stereo viewing; and
   rotate, responsive to first user input, the rendering of the 3D object.

2. The non-transitory computer readable memory medium of claim 1,
   wherein to render the set of images as the 3D object, the program instructions are further executable to perform one or more of:
   wrap, render, and/or re-render output of an existing monoscopic 3D viewer within the 2D webpage structure; or
   render a left image and a right image to produce a stereoscopic view.

3. The non-transitory computer readable memory medium of claim 1,
   wherein the first user input comprises one or more of:
   a detected gesture of a user; or
   a detected selection via a virtual beam projected from a user input device.

4. The non-transitory computer readable memory medium of claim 1,
   wherein the program instructions are further executable to:
   animate, responsive to second user input, the rendering of the 3D object.

5. The non-transitory computer readable memory medium of claim 4,
   wherein the second user input comprises one or more of:
   a detected gesture of a user; or
   a detected selection via a virtual beam projected from a user input device.

6. The non-transitory computer readable memory medium of claim 1,
   wherein the program instructions are further executable to:
   magnify, responsive to second user input, the rendering of the 3D object.

7. The non-transitory computer readable memory medium of claim 1,
   wherein the program instructions are further executable to:
   provide instructions to a 3D printer for printing the 3D object.

8. A three-dimensional (3D) stereoscopic display system comprising:
   at least one processor;
   one or more displays, coupled to the at least one processor; and
   a memory coupled to the at least one processor, wherein the memory has stored thereon instructions executable by the at least one processor to:
   display a two-dimensional (2D) webpage structure via the one or more displays, wherein the 2D webpage structure includes 3D embedded content;
   analyze the 2D webpage structure for a set of images and associated locations of the images within the webpage structure;
   identify at least one set of images, wherein the at least one set of images correspond to the 3D content, and wherein the at least one set of images allow a 360-degree view of an object within the at least one set of images;
   render, via the one or more displays, the set of images as a 3D object, including at least one of wrapping, rendering, and re-rendering output of an existing monoscopic 3D viewer within the 2D webpage structure; and
   rotate, responsive to first user input, the rendering of the 3D object.

9. The 3D stereoscopic display system of claim 7,
   wherein each image of the set of images is from a different viewpoint.

10. The 3D stereoscopic display system of claim 7,
wherein to render the set of images as the 3D object, the instructions are further executable by the at least one processor to perform one or more of:
  order unordered images within the set of images for stereo viewing; or
  render a left image and a right image to produce a stereoscopic view.

11. The 3D stereoscopic display system of claim 7,
wherein the first user input comprises one or more of:
  a detected gesture of a user; or
  a detected selection via a virtual beam projected from a user input device.

12. The 3D stereoscopic display system of claim 7,
wherein the instructions are further executable by the at least one processor to:
  animate, responsive to second user input, the rendering of the 3D object.

13. The 3D stereoscopic display system of claim 12,
wherein the second user input comprises one or more of:
  a detected gesture of a user; or
  a detected selection via a virtual beam projected from a user input device.

14. The 3D stereoscopic display system of claim 7,
wherein the instructions are further executable by the at least one processor to:
  magnify, responsive to second user input, the rendering of the 3D object.

15. The 3D stereoscopic display system of claim 7,
wherein the instructions are further executable by the at least one processor to:
  provide instructions to a 3D printer for printing the 3D object.

16. A method for visualization and interaction with a set of images provided in a two-dimensional (2D) webpage structure, comprising:
  display the 2D webpage structure via one or more displays, wherein the 2D webpage structure includes 3D embedded content;
  analyzing the 2D webpage structure for a set of images and associated locations of the images within the webpage structure, wherein each image of the set of images is from a different viewpoint;
  identifying at least one set of images, wherein the at least one set of images correspond to the 3D content, and wherein the at least one set of images allow a 360-degree view of an object within the at least one set of images;
  rendering, via the one or more displays, the set of images as a 3D object; and
  rotating, responsive to first user input, the rendering of the 3D object.

17. The method of claim 16,
wherein rendering the set of images as the 3D object further comprises one or more of:
  ordering unordered images within the set of images for stereo viewing;
  wrapping, rendering, and/or re-rendering output of an existing monoscopic 3D viewer within the 2D webpage structure; or
  rendering a left image and a right image to produce a stereoscopic view.

18. The method of claim 16,
wherein the first user input comprises one or more of:
  a detected gesture of a user; or
  a detected selection via a virtual beam projected from a user input device.

19. The method of claim 16, further comprising:
animating, responsive to second user input, the rendering of the 3D object.

20. The method of claim 16, further comprising:
magnifying, responsive to second user input, the rendering of the 3D object.

* * * * *

UNITED STATES PATENT AND TRADEMARK OFFICE
CERTIFICATE OF CORRECTION

PATENT NO. : 10,271,043 B2
APPLICATION NO. : 15/355298
DATED : April 23, 2019
INVENTOR(S) : Clifford S. Champion et al.

Page 1 of 1

It is certified that error appears in the above-identified patent and that said Letters Patent is hereby corrected as shown below:

In the Claims

Claim 9, Column 36, Line 65, please delete "7" and substitute --8--.

Claim 10, Column 37, Line 1, please delete "7" and substitute --8--.

Claim 11, Column 37, Line 9, please delete "7" and substitute --8--.

Claim 12, Column 37, Line 14, please delete "7" and substitute --8--.

Claim 14, Column 37, Line 25, please delete "7" and substitute --8--.

Claim 15, Column 37, Line 30, please delete "7" and substitute --8--.

Signed and Sealed this
Eighteenth Day of June, 2019

Andrei Iancu
*Director of the United States Patent and Trademark Office*